US012610060B2

(12) United States Patent
Gul et al.

(10) Patent No.: US 12,610,060 B2
(45) Date of Patent: Apr. 21, 2026

(54) SETTING PDU SET IMPORTANCE FOR IMMERSIVE MEDIA STREAMS

(71) Applicant: Nokia Technologies Oy, Espoo (FI)

(72) Inventors: Serhan Gul, Berlin (DE); Igor Danilo Diego Curcio, Gravina de Catania (IT); Saba Ahsan, Rawalpindi (PK); Gazi Karam Illahi, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/042,120

(22) Filed: Jan. 31, 2025

(65) Prior Publication Data

US 2025/0254335 A1      Aug. 7, 2025

Related U.S. Application Data

(60) Provisional application No. 63/627,860, filed on Feb. 1, 2024.

(51) Int. Cl.
| | |
|---|---|
| *H04N 19/119* | (2014.01) |
| *H04N 19/162* | (2014.01) |
| *H04N 19/184* | (2014.01) |
| *H04N 19/52* | (2014.01) |
| *H04N 19/12* | (2014.01) |
| *H04N 19/597* | (2014.01) |

(52) U.S. Cl.
CPC ......... *H04N 19/162* (2014.11); *H04N 19/119* (2014.11); *H04N 19/184* (2014.11); *H04N 19/52* (2014.11); *H04N 19/597* (2014.11)

(58) Field of Classification Search
CPC .... H04N 19/119; H04N 19/184; H04N 19/52; H04N 19/12; H04N 19/124; H04N 19/11

USPC ........................ 348/39, 14, 12, 14.01, 14.02
See application file for complete search history.

(56) References Cited

U.S. PATENT DOCUMENTS

| | | | |
|---|---|---|---|
| 11,805,303 | B2 | 10/2023 | Curcio et al. |
| 2019/0253622 | A1* | 8/2019 | Van der Auwera .... H04N 19/86 |
| 2019/0253703 | A1* | 8/2019 | Coban .................. H04N 19/159 |

(Continued)

OTHER PUBLICATIONS

Bross et al., "Overview of the Versatile Video Coding (VVC) Standard and Its Applications", IEEE Transactions on Circuits and Systems for Viedo Technology, vol. 31, No. 10, Oct. 2021 pp. 3736-3764.

(Continued)

*Primary Examiner* — Daquan Zhao
(74) *Attorney, Agent, or Firm* — McCarter & English, LLP

(57) ABSTRACT

A sender of a bitstream of coded 360-degree video defines PDU sets of the coded 360-degree video. The PDU sets include spatial region(s) of a frame of the coded 360-degree video. The sender assigns protocol data unit set importances to the protocol data unit sets, wherein the assignment is based on a spatial location of the spatial region(s) included in the protocol data unit set and adaptation criteria. The sender adapts over time the PDU set importance values of the PDU sets corresponding to the spatial location based on the adaptation criteria. The sender sends, toward a receiver, the bitstream including the coded 360-degree video. A receiver receives the bitstream of coded 360-degree video, parses information, and outputs at least part of a decoded 360-degree video based on the parsed information.

22 Claims, 20 Drawing Sheets

(56)                References Cited

U.S. PATENT DOCUMENTS

2025/0220223 A1*   7/2025   Hendry ............... H04N 19/577

OTHER PUBLICATIONS

RFC 3551 "RTP Profile for Audio and Video Conferences with Minimal Control", Schulzrinnet et al., Jul. 2003, 44 pages.
RFC 3550, "RTP: A Transport Protocol for Real-Time Applications", Schulzrinne, et al., Jul. 2003 89 pages.
RFC 8285, "A General Mechancism for RTP Header Extensions", Singer, et al., Oct. 2017, 25 pages.
3GPP TS 26,522 V0.1.1, "3rd Generation Partnership Project; Technical Specification Group Services and System Aspects; 5G Real-time Media Transport Protocol Configurations (Release 18)", Aug. 2023, 19 pages.
Sanatamaria, Maria, et al., "Coding of volumetric content with MIV using VVC subpictures", arXiv:2206.02588v1 [eess.IV], Jun. 2022, 7 pages.
S4-230572, "[5G_RTP] RTP HE fields for PDU Set and Data Burst information", 3GPP TSG SA WG#123-e, Apr. 2023 3 pages.
3GPP TR 23.700-60 V18.0.0, "3rd Generation Partnership Project, Technical Specification Group Services and System Aspects; Study on XR (Extended Reality) and media services (Release 18)", Dec. 2022, 266 pages.

Sreedhar et al., "A Method, An Apparatus, A Computer Program Product For PDUs and PDU Set Handling", U.S. Appl. No. 63/441,279, filed Jan. 26, 2023, 116 pages.
ITU-T H.264, ISO/IEC 24496-10, "Draft Text of Final Draft International Standard for Advanced Video Coding (ITU-T Rec. H.264 [ISO/IEC 14496-10 AVC)", Mar. 2003, 251 pages.
ITU-T H.265, ISO/IEC 23008-2, "Part 2: High efficiency video coding (HEVC)", Oct. 2023, 14 pages.
ITU-T H.266, ISO/IEC 23090-3, "Part 3: Versatile Video Coding (VVC)", Sep. 2022, 15 pages.
3GPP TS 23.501, V 19.2.1, "3rd Generation Partnership Project; Technical Specification Group Services and System Aspects; System architecture for the 5G System (5GS); Stage 2 (Release 19)", Jan. 2025, 771 pages.
3GPP TS 26.114, V18.9.0, "3rd Generation Partnership Project; Technical Specification Group Services and System Aspects; IP Multimedia Subsystem (IMS); Multimedia Telephony; Media handling and interaction (Release 18)", Jan. 2025, 510 pages.
3GPP TR 26.962, V18.0.0, "3rd Generation Partnership Project; Technical Specification Group Services and System Aspects Immersive Teleconferencing and Telepresence for Remote Terminals (ITT4RT) Operation and Usage Guidelines (Release 18)", Mar. 2024, 29 pages.

* cited by examiner

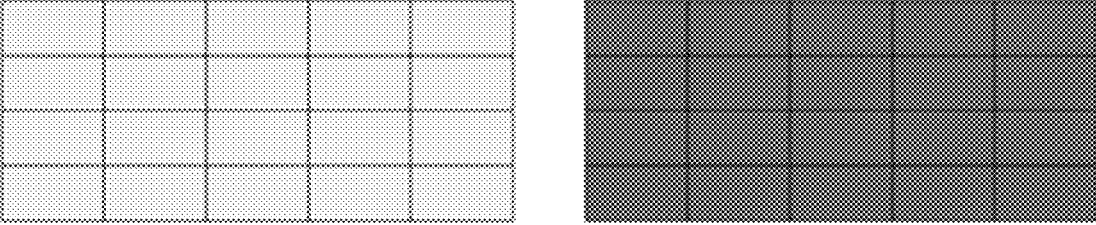
FIG. 3A: Tiled encoding of 360-degree video low quality  FIG. 3B: Tiled encoding of 360-degree video high quality
FIG. 3C: Tile qualities in delivered stream, higher quality tiles in the viewport region.
FIG. 3

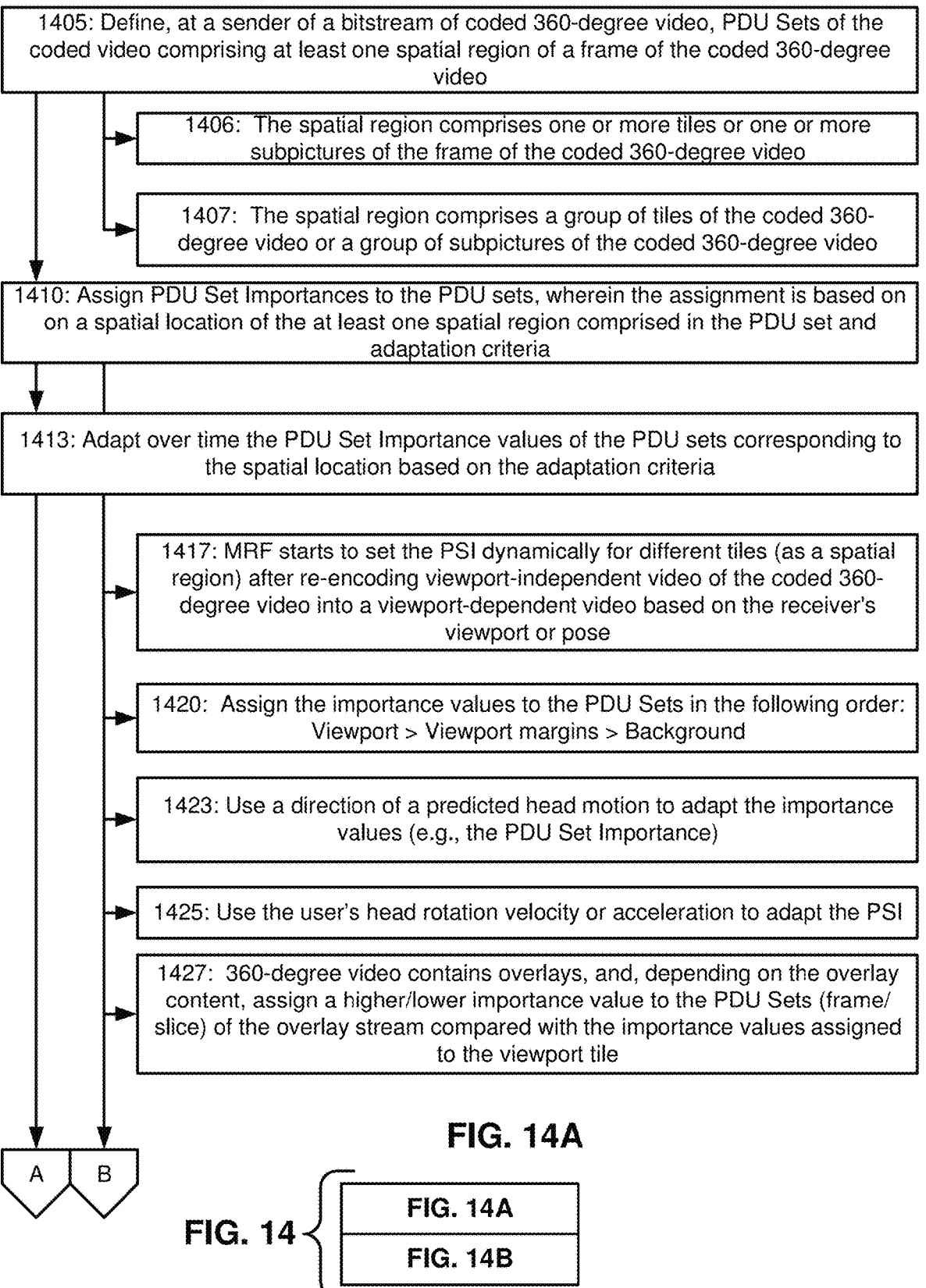

1405: Define, at a sender of a bitstream of coded 360-degree video, PDU Sets of the coded video comprising at least one spatial region of a frame of the coded 360-degree video 1406: The spatial region comprises one or more tiles or one or more subpictures of the frame of the coded 360-degree video 1407: The spatial region comprises a group of tiles of the coded 360-degree video or a group of subpictures of the coded 360-degree video 1410: Assign PDU Set Importances to the PDU sets, wherein the assignment is based on on a spatial location of the at least one spatial region comprised in the PDU set and adaptation criteria 1413: Adapt over time the PDU Set Importance values of the PDU sets corresponding to the spatial location based on the adaptation criteria 1417: MRF starts to set the PSI dynamically for different tiles (as a spatial region) after re-encoding viewport-independent video of the coded 360-degree video into a viewport-dependent video based on the receiver's viewport or pose 1420: Assign the importance values to the PDU Sets in the following order: Viewport > Viewport margins > Background 1423: Use a direction of a predicted head motion to adapt the importance values (e.g., the PDU Set Importance)

1425: Use the user's head rotation velocity or acceleration to adapt the PSI

1427: 360-degree video contains overlays, and, depending on the overlay content, assign a higher/lower importance value to the PDU Sets (frame/slice) of the overlay stream compared with the importance values assigned to the viewport tile

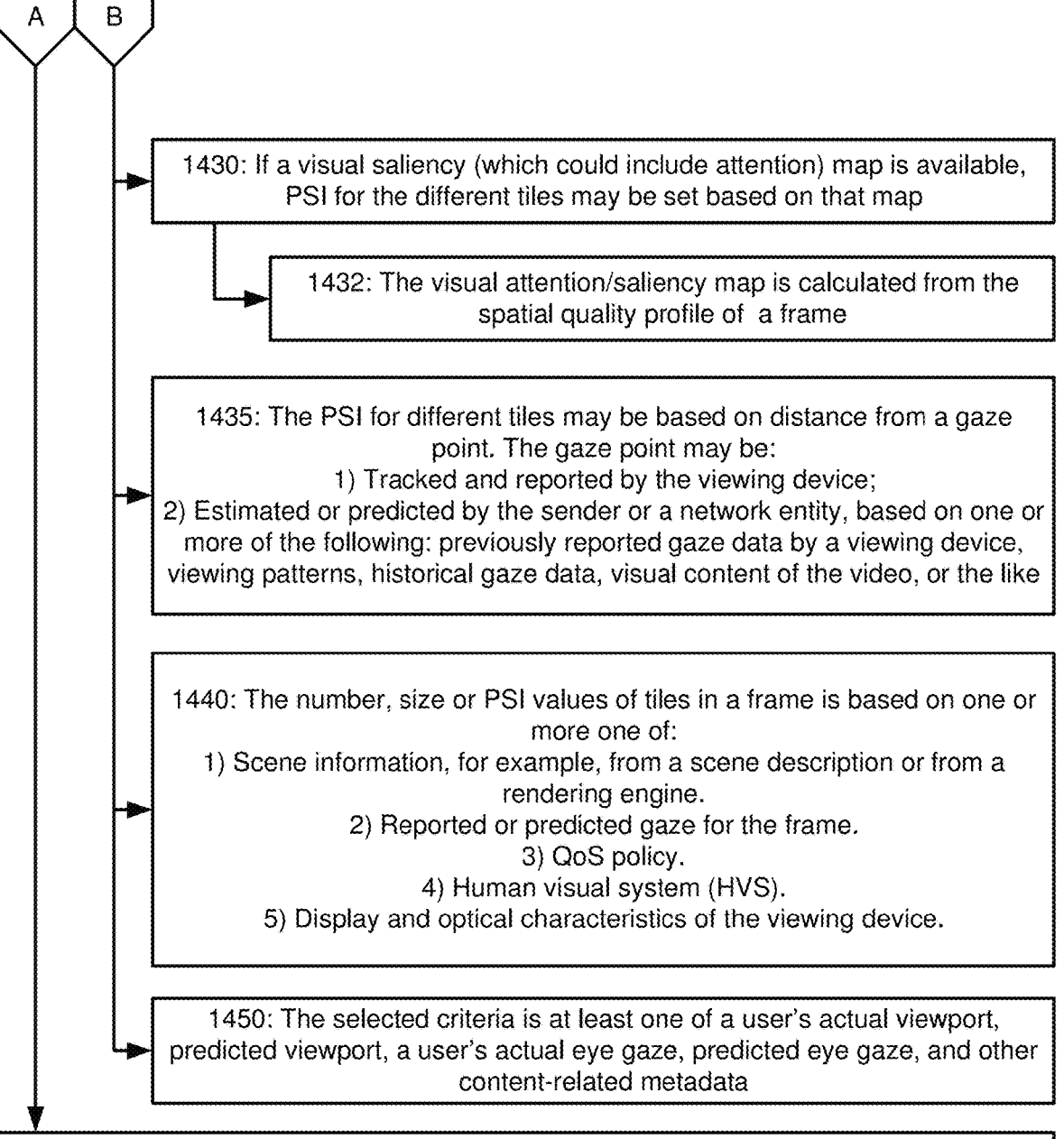

A   B

1430: If a visual saliency (which could include attention) map is available, PSI for the different tiles may be set based on that map 1432: The visual attention/saliency map is calculated from the spatial quality profile of a frame 1435: The PSI for different tiles may be based on distance from a gaze point. The gaze point may be:
1) Tracked and reported by the viewing device;
2) Estimated or predicted by the sender or a network entity, based on one or more of the following: previously reported gaze data by a viewing device, viewing patterns, historical gaze data, visual content of the video, or the like 1440: The number, size or PSI values of tiles in a frame is based on one or more one of:
1) Scene information, for example, from a scene description or from a rendering engine.
2) Reported or predicted gaze for the frame.
3) QoS policy.
4) Human visual system (HVS).
5) Display and optical characteristics of the viewing device.

1450: The selected criteria is at least one of a user's actual viewport, predicted viewport, a user's actual eye gaze, predicted eye gaze, and other content-related metadata 1415: Send, by the sender toward a receiver, the bitstream comprising the coded 360-degree video

FIG. 14B

1510: Decide PSI values for the tiles on the boundaries may be decided depending on the portion of the tile that falls into the viewport 1520: Distinguish between the background tiles that are outside but close to the viewport and the other background tiles that are far from the viewport

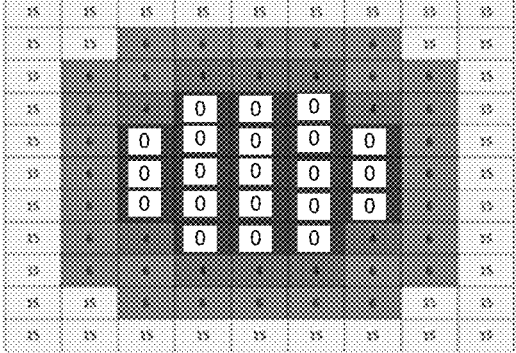
FIG. 16A
FIG. 16B
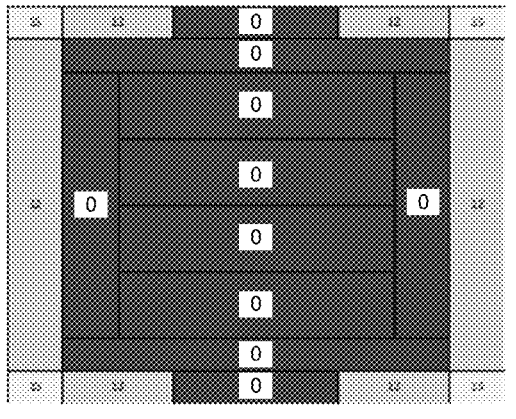
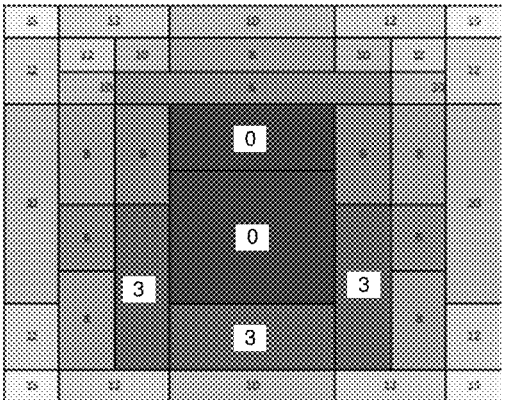
FIG. 17A
FIG. 17B

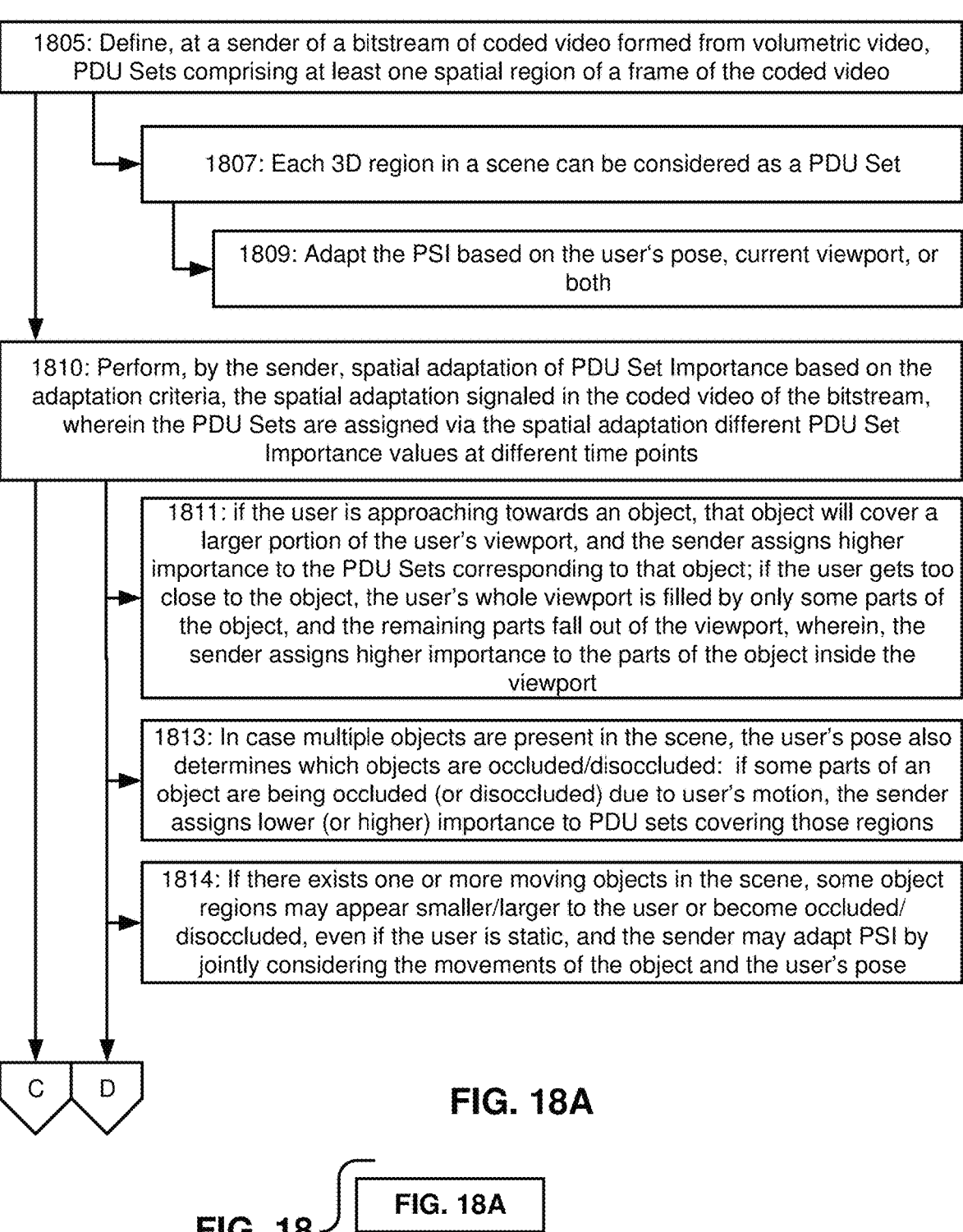

1805: Define, at a sender of a bitstream of coded video formed from volumetric video, PDU Sets comprising at least one spatial region of a frame of the coded video 1807: Each 3D region in a scene can be considered as a PDU Set 1809: Adapt the PSI based on the user's pose, current viewport, or both 1810: Perform, by the sender, spatial adaptation of PDU Set Importance based on the adaptation criteria, the spatial adaptation signaled in the coded video of the bitstream, wherein the PDU Sets are assigned via the spatial adaptation different PDU Set Importance values at different time points 1811: if the user is approaching towards an object, that object will cover a larger portion of the user's viewport, and the sender assigns higher importance to the PDU Sets corresponding to that object; if the user gets too close to the object, the user's whole viewport is filled by only some parts of the object, and the remaining parts fall out of the viewport, wherein, the sender assigns higher importance to the parts of the object inside the viewport 1813: In case multiple objects are present in the scene, the user's pose also determines which objects are occluded/disoccluded: if some parts of an object are being occluded (or disoccluded) due to user's motion, the sender assigns lower (or higher) importance to PDU sets covering those regions 1814: If there exists one or more moving objects in the scene, some object regions may appear smaller/larger to the user or become occluded/ disoccluded, even if the user is static, and the sender may adapt PSI by jointly considering the movements of the object and the user's pose

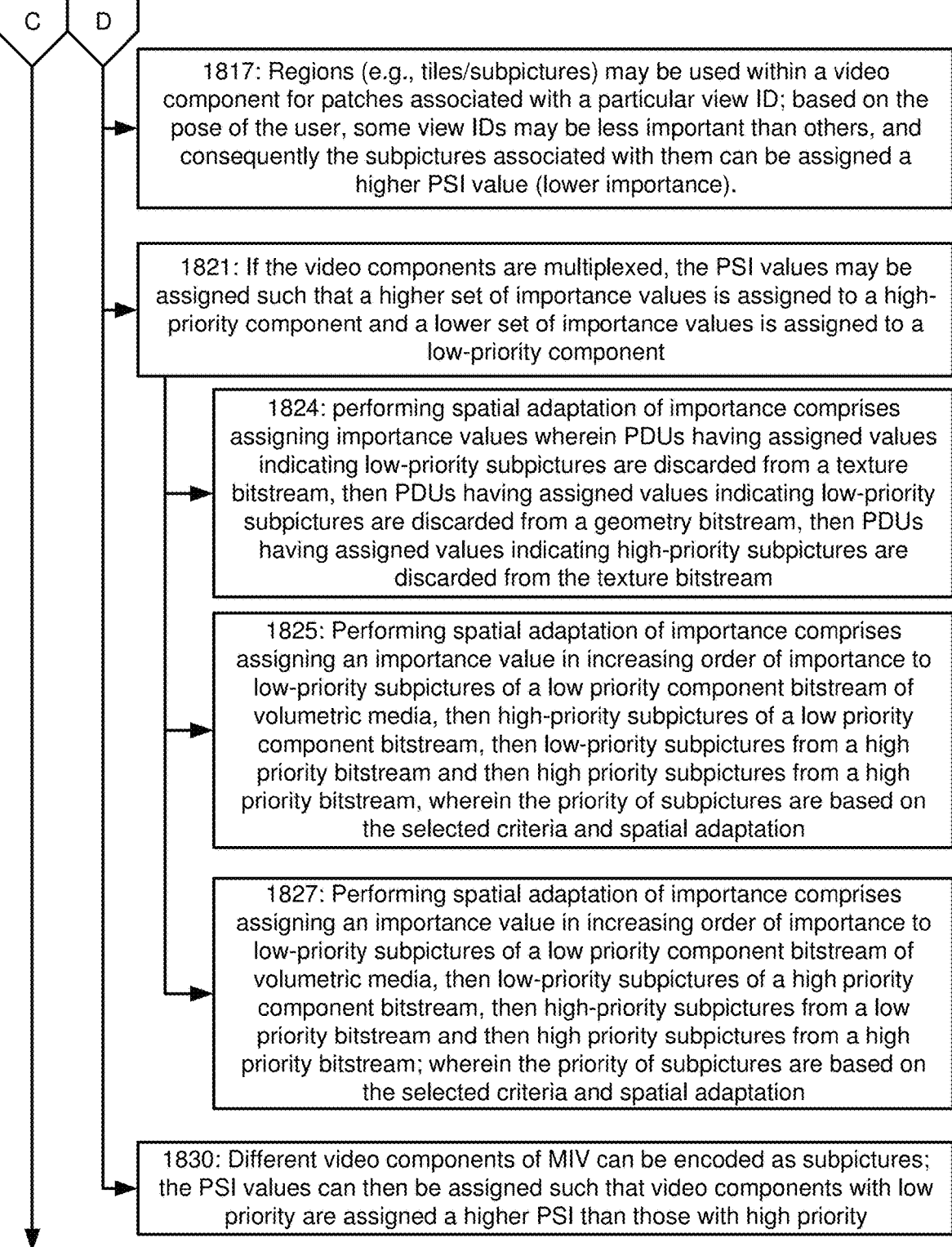

1817: Regions (e.g., tiles/subpictures) may be used within a video component for patches associated with a particular view ID; based on the pose of the user, some view IDs may be less important than others, and consequently the subpictures associated with them can be assigned a higher PSI value (lower importance).

1821: If the video components are multiplexed, the PSI values may be assigned such that a higher set of importance values is assigned to a high-priority component and a lower set of importance values is assigned to a low-priority component 1824: performing spatial adaptation of importance comprises assigning importance values wherein PDUs having assigned values indicating low-priority subpictures are discarded from a texture bitstream, then PDUs having assigned values indicating low-priority subpictures are discarded from a geometry bitstream, then PDUs having assigned values indicating high-priority subpictures are discarded from the texture bitstream 1825: Performing spatial adaptation of importance comprises assigning an importance value in increasing order of importance to low-priority subpictures of a low priority component bitstream of volumetric media, then high-priority subpictures of a low priority component bitstream, then low-priority subpictures from a high priority bitstream and then high priority subpictures from a high priority bitstream, wherein the priority of subpictures are based on the selected criteria and spatial adaptation 1827: Performing spatial adaptation of importance comprises assigning an importance value in increasing order of importance to low-priority subpictures of a low priority component bitstream of volumetric media, then low-priority subpictures of a high priority component bitstream, then high-priority subpictures from a low priority bitstream and then high priority subpictures from a high priority bitstream; wherein the priority of subpictures are based on the selected criteria and spatial adaptation 1830: Different video components of MIV can be encoded as subpictures; the PSI values can then be assigned such that video components with low priority are assigned a higher PSI than those with high priority 1815: Send, by the sender toward a receiver, the bitstream comprising the coded video

FIG. 18B

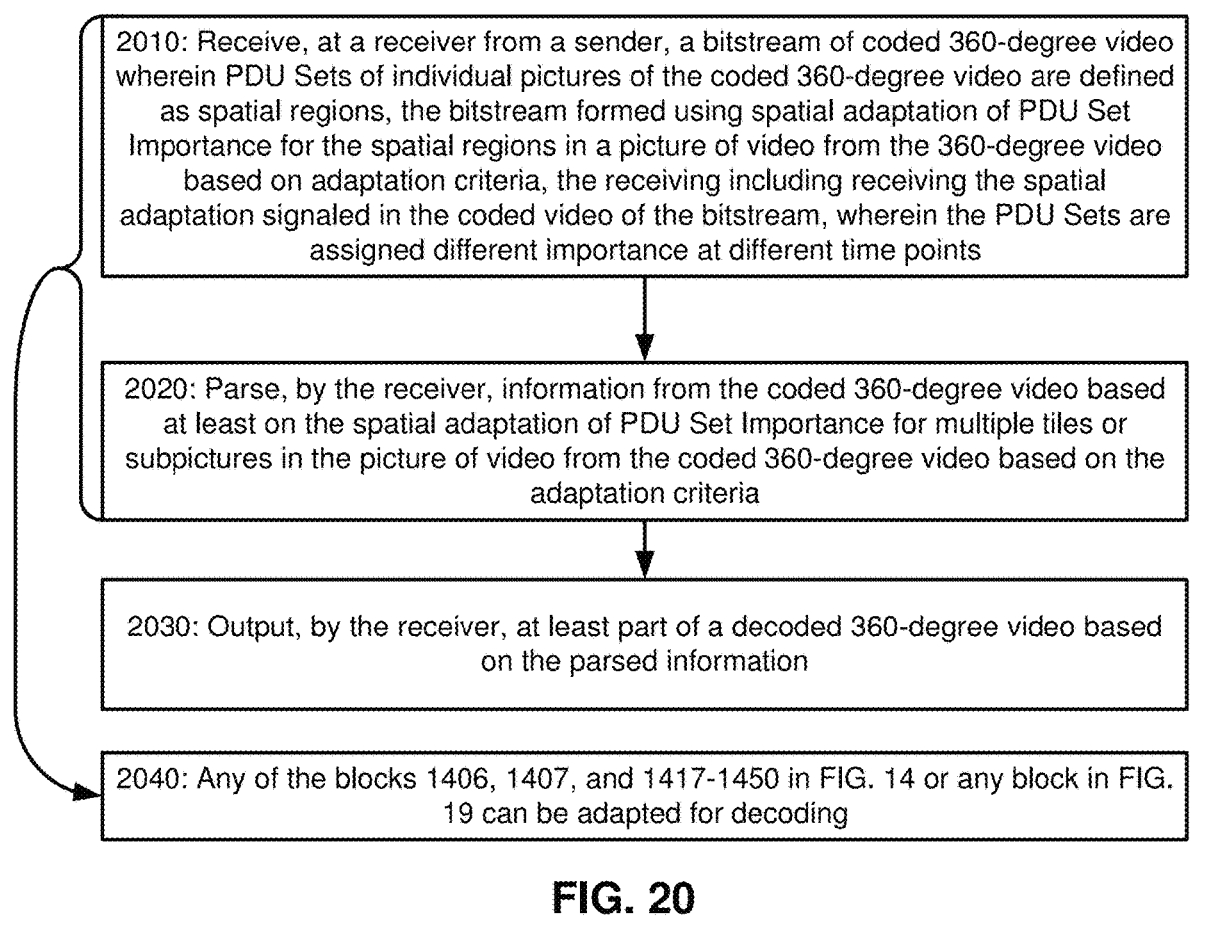

2010: Receive, at a receiver from a sender, a bitstream of coded 360-degree video wherein PDU Sets of individual pictures of the coded 360-degree video are defined as spatial regions, the bitstream formed using spatial adaptation of PDU Set Importance for the spatial regions in a picture of video from the 360-degree video based on adaptation criteria, the receiving including receiving the spatial adaptation signaled in the coded video of the bitstream, wherein the PDU Sets are assigned different importance at different time points 2020: Parse, by the receiver, information from the coded 360-degree video based at least on the spatial adaptation of PDU Set Importance for multiple tiles or subpictures in the picture of video from the coded 360-degree video based on the adaptation criteria 2030: Output, by the receiver, at least part of a decoded 360-degree video based on the parsed information 2040: Any of the blocks 1406, 1407, and 1417-1450 in FIG. 14 or any block in FIG. 19 can be adapted for decoding

FIG. 20

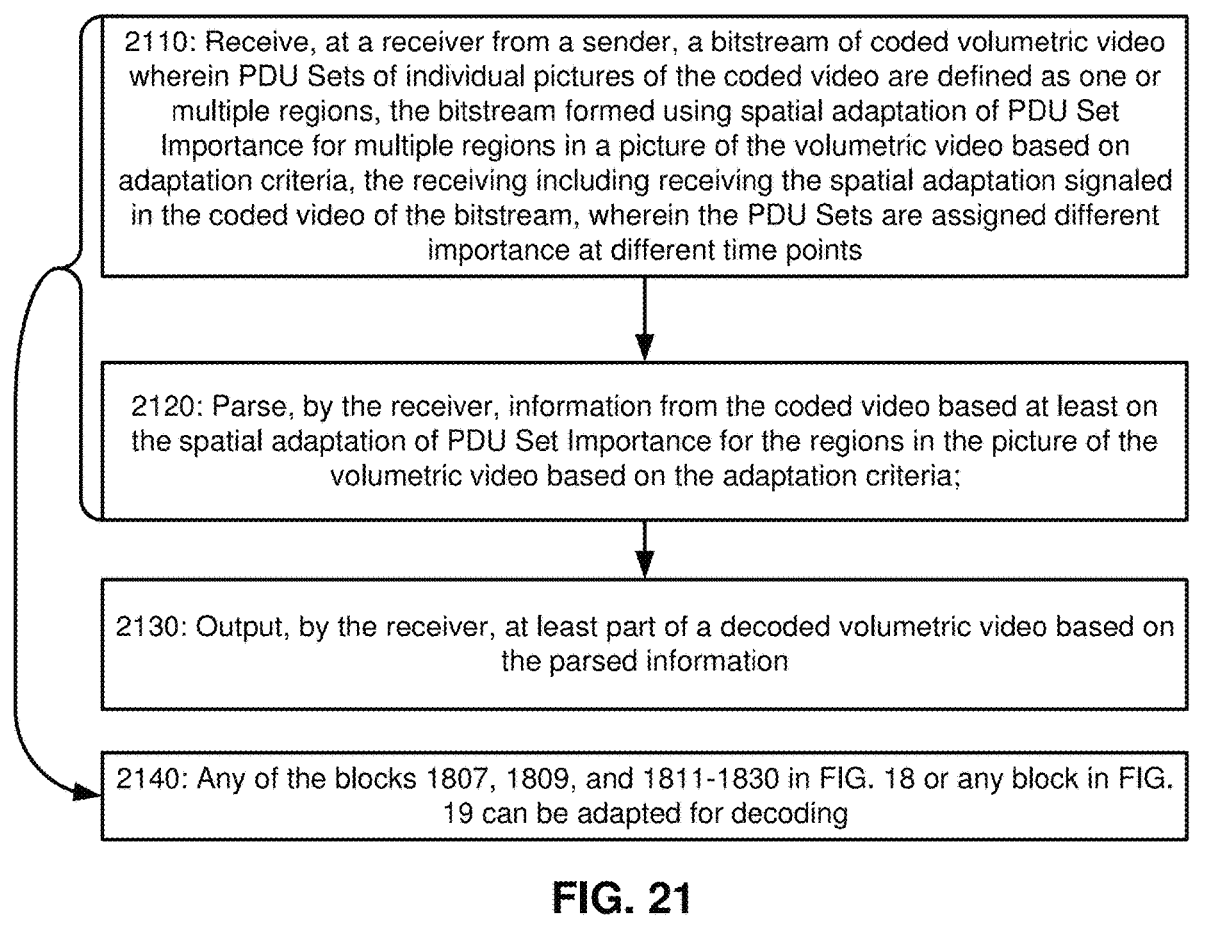

2110: Receive, at a receiver from a sender, a bitstream of coded volumetric video wherein PDU Sets of individual pictures of the coded video are defined as one or multiple regions, the bitstream formed using spatial adaptation of PDU Set Importance for multiple regions in a picture of the volumetric video based on adaptation criteria, the receiving including receiving the spatial adaptation signaled in the coded video of the bitstream, wherein the PDU Sets are assigned different importance at different time points 2120: Parse, by the receiver, information from the coded video based at least on the spatial adaptation of PDU Set Importance for the regions in the picture of the volumetric video based on the adaptation criteria;

2130: Output, by the receiver, at least part of a decoded volumetric video based on the parsed information 2140: Any of the blocks 1807, 1809, and 1811-1830 in FIG. 18 or any block in FIG. 19 can be adapted for decoding

FIG. 21

SETTING PDU SET IMPORTANCE FOR IMMERSIVE MEDIA STREAMS

CROSS-REFERENCE TO RELATED APPLICATIONS

The present application claims the benefit under 35 U.S.C. § 119 (e) of U.S. Provisional Patent Application No. 63/627,860, filed on Feb. 1, 2024, the disclosure of which is hereby incorporated by reference in its entirety. Any and all applications for which a foreign or domestic priority claim is identified in the Application Data Sheet of the present application are hereby incorporated by reference under 37 CFR § 1.57.

TECHNICAL FIELD

Examples of embodiments herein relate generally to video coding and decoding and, more specifically, relate to immersive media streams such as 360-degree video or volumetric video and communication of the same.

BACKGROUND

In a communication system, communicating devices use a protocol stack comprising multiple layers. For instance, there is an application layer that is typically the highest layer in the stack, and an L1 (physical) layer that is the lowest layer and performs the actual transmission over a physical interface. A sender apparatus would communicate data from an application in the application layer, through the various layers in the protocol stack, to the L1 layer and over the physical layer interface. A receiver apparatus receives the physical layer interface communication on its own L1 layer, and the communication is processed up through the various layers until data is received by whichever layer is appropriate. In a wireless communication system, one or more physical layer interfaces may be a wireless interface. For example, these could be E-UTRA (Evolved Universal Terrestrial Radio Access), NR (new radio), or other radio access technologies and corresponding wireless interfaces.

When data is transmitted, the protocol stack layers package data into what are called protocol data units (PDUs). Certain layers have their own versions of PDUs. PDUs carrying the data generated at the application layer may be grouped in a "PDU Set" which is defined as the following: A PDU Set is one or more PDUs carrying the payload of one unit of information generated at the application level (e.g., frame(s) or video slice(s) or the like for extended Reality (XR) Services). The video itself may be coded from immersive media, such as 360-degree video or volumetric video. Immersive media refers to media that give users an elevated sense of presence. This media could involve technologies like AR (augmented reality), VR (virtual reality), MR (mixed reality) and more generally XR (which includes the previous ones). So, both 360-degree video and volumetric video are types of immersive media. While PDU Sets are useful tools, improvements in their use could be made.

BRIEF SUMMARY

This section is intended to include examples and is not intended to be limiting.

In an exemplary embodiment, a method is disclosed that includes defining, at a sender of a bitstream of coded 360-degree video, protocol data unit sets of the coded 360-degree video, the protocol data unit sets comprising at least one spatial region of a frame of the coded 360-degree video; assigning, by the sender, protocol data unit set importance values to the protocol data unit sets, wherein the assignment is based on a spatial location of the at least one spatial region comprised in the protocol data unit set and adaptation criteria; adapting, by the sender, over time the protocol data unit set importance values of the protocol data unit sets corresponding to the spatial location based on the adaptation criteria; and sending, by the sender toward a receiver, the bitstream comprising the coded 360-degree video.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: defining, at a sender of a bitstream of coded 360-degree video, protocol data unit sets of the coded 360-degree video, the protocol data unit sets comprising at least one spatial region of a frame of the coded 360-degree video; assigning, by the sender, protocol data unit set importance values to the protocol data unit sets, wherein the assignment is based on a spatial location of the at least one spatial region comprised in the protocol data unit set and adaptation criteria; adapting, by the sender, over time the protocol data unit set importance values of the protocol data unit sets corresponding to the spatial location based on the adaptation criteria; and sending, by the sender toward a receiver, the bitstream comprising the coded 360-degree video.

An exemplary computer program product includes a computer-readable storage medium bearing instructions that, when executed by an apparatus, cause the apparatus to perform at least the following: defining, at a sender of a bitstream of coded 360-degree video, protocol data unit sets of the coded 360-degree video, the protocol data unit sets comprising at least one spatial region of a frame of the coded 360-degree video; assigning, by the sender, protocol data unit set importance values to the protocol data unit sets, wherein the assignment is based on a spatial location of the at least one spatial region comprised in the protocol data unit set and adaptation criteria; adapting, by the sender, over time the protocol data unit set importance values of the protocol data unit sets corresponding to the spatial location based on the adaptation criteria; and sending, by the sender toward a receiver, the bitstream comprising the coded 360-degree video.

In another exemplary embodiment, an apparatus comprises means for performing: defining, at a sender of a bitstream of coded 360-degree video, protocol data unit sets of the coded 360-degree video, the protocol data unit sets comprising at least one spatial region of a frame of the coded 360-degree video; assigning, by the sender, protocol data unit set importance values to the protocol data unit sets, wherein the assignment is based on a spatial location of the at least one spatial region comprised in the protocol data unit set and adaptation criteria; adapting, by the sender, over time the protocol data unit set importance values of the protocol data unit sets corresponding to the spatial location based on the adaptation criteria; and sending, by the sender toward a receiver, the bitstream comprising the coded 360-degree video.

In an exemplary embodiment, a method is disclosed that includes receiving, at a receiver from a sender, a bitstream of coded 360-degree video wherein protocol data unit sets of individual pictures of the coded 360-degree video are defined as spatial regions, the bitstream formed using spatial adaptation of protocol data unit set importance values for the spatial regions in a picture of video from the coded 360-degree video based on adaptation criteria, the receiving including receiving the spatial adaptation signaled in the coded video of the bitstream, wherein the protocol data unit sets are assigned different importance values at different time points; parsing, by the receiver, information from the coded 360-degree video based at least on the spatial adaptation of protocol data unit set importance values for multiple tiles or subpictures in the picture of video from the coded 360-degree video based on the adaptation criteria; and outputting, by the receiver, at least part of a decoded 360-degree video based on the parsed information.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: receiving, at a receiver from a sender, a bitstream of coded 360-degree video wherein protocol data unit sets of individual pictures of the coded 360-degree video are defined as spatial regions, the bitstream formed using spatial adaptation of protocol data unit set importance values for the spatial regions in a picture of video from the coded 360-degree video based on adaptation criteria, the receiving including receiving the spatial adaptation signaled in the coded video of the bitstream, wherein the protocol data unit sets are assigned different importance values at different time points; parsing, by the receiver, information from the coded 360-degree video based at least on the spatial adaptation of protocol data unit set importance values for multiple tiles or subpictures in the picture of video from the coded 360-degree video based on the adaptation criteria; and outputting, by the receiver, at least part of a decoded 360-degree video based on the parsed information.

An exemplary computer program product includes a computer-readable storage medium bearing instructions that, when executed by an apparatus, cause the apparatus to perform at least the following: receiving, at a receiver from a sender, a bitstream of coded 360-degree video wherein protocol data unit sets of individual pictures of the coded 360-degree video are defined as spatial regions, the bitstream formed using spatial adaptation of protocol data unit set importance values for the spatial regions in a picture of video from the coded 360-degree video based on adaptation criteria, the receiving including receiving the spatial adaptation signaled in the coded video of the bitstream, wherein the protocol data unit sets are assigned different importance values at different time points; parsing, by the receiver, information from the coded 360-degree video based at least on the spatial adaptation of protocol data unit set importance values for multiple tiles or subpictures in the picture of video from the coded 360-degree video based on the adaptation criteria; and outputting, by the receiver, at least part of a decoded 360-degree video based on the parsed information.

In another exemplary embodiment, an apparatus comprises means for performing: receiving, at a receiver from a sender, a bitstream of coded 360-degree video wherein protocol data unit sets of individual pictures of the coded 360-degree video are defined as spatial regions, the bitstream formed using spatial adaptation of protocol data unit set importance values for the spatial regions in a picture of video from the coded 360-degree video based on adaptation criteria, the receiving including receiving the spatial adaptation signaled in the coded video of the bitstream, wherein the protocol data unit sets are assigned different importance values at different time points; parsing, by the receiver, information from the coded 360-degree video based at least on the spatial adaptation of protocol data unit set importance values for multiple tiles or subpictures in the picture of video from the coded 360-degree video based on the adaptation criteria; and outputting, by the receiver, at least part of a decoded 360-degree video based on the parsed information.

BRIEF DESCRIPTION OF THE DRAWINGS

In the attached drawings:

FIG. 3 is split into FIGS. 3A, 3B, and 3C, illustrates a tiled video with multiple quality levels, where FIG. 3A illustrates tiled encoding of 360-degree video of low quality, FIG. 3B illustrates tiled encoding of 360-degree video of high quality, and FIG. 3C illustrates tile qualities in a delivered stream, and higher quality tiles in the viewport region;

FIG. 14, which is split over FIGS. 14A and 14B, is a logic flow diagram for setting PDU set importance for immersive media streams;

FIGS. 16A and 16B show examples of Human Visual System (HVS) based PSI assignment, assuming that the user's eye gaze is at the frame center for each frame;

FIGS. 17A and 17B show example non-uniform tiling and PSI assignment based on HVS as well as display and optical characteristics of a typical Head Mounted Display (HMD) assuming that the user's eye gaze is at the frame context;

FIG. 18, which is split over FIGS. 18A and 18B, is a logic flow diagram for setting PDU set importance for volumetric video;

FIG. 20 is a logic flow diagram of an example of decoding performed by a receiver and corresponds to the encoding of FIG. 14 (and FIG. 19); and FIG. 21 is a logic flow diagram of an example of decoding performed by a receiver and corresponds to the encoding of FIG. 18 (and FIG. 19).

DETAILED DESCRIPTION OF THE DRAWINGS

Figure 1:
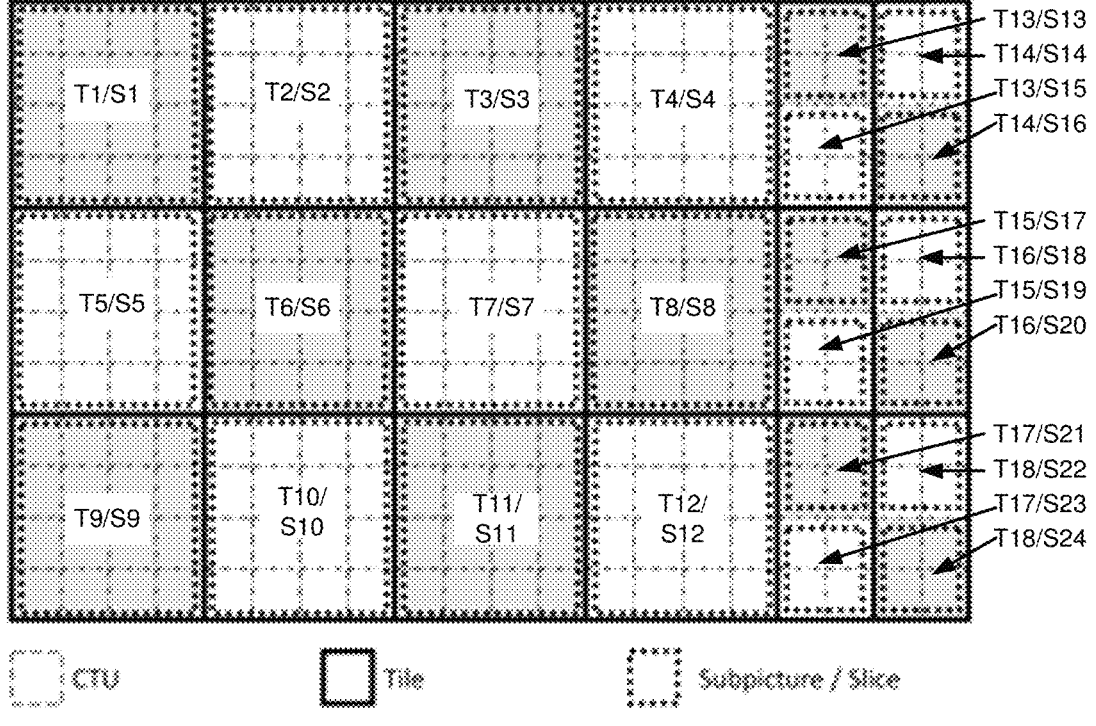
FIG. 1 shows a picture partitioned into 18 tiles, 24 slices and 24 subpictures.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both". As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Any flow diagram (such as FIGS. 14, parts of 15, 18, 19, 20, and 21) or signaling diagram herein is considered to be a logic flow diagram, and illustrates the operation of an exemplary method, results of execution of computer program instructions embodied on a computer readable memory, functions performed by logic implemented in hardware, and/or interconnected means for performing functions in accordance with an exemplary embodiment. Block diagrams (such as FIGS. 7-9, 12, and 13) also illustrate the operation of an exemplary method, results of execution of computer program instructions embodied on a computer readable memory, functions performed by logic implemented in hardware, and/or interconnected means for performing functions in accordance with an exemplary embodiment.

In this document, any acronym and its definition are considered to be equivalent, such as PDU Set and protocol data unit set. Furthermore, any capitalized word and the same word in lowercase are considered to be equivalent, such as Viewport and viewport.

Before a description of exemplary embodiments is described, information is provided about the technological areas for which the embodiments are related.

One topic of interest is spatial random access in video coding standards. In this area, bitstreams conforming to modern video compression standards developed by the Moving Picture Experts Group (MPEG) such as H.264/AVC, H.265/HEVC and H.266/VVC include a number of access units, each including coded data associated with exactly one picture. Each access unit is divided into a sequence of data units called network abstraction layer (NAL) units that are consecutive in decoding order. Some NAL units contain parameter sets that carry high-level information regarding the entire coded video sequence or a subset of the pictures within the sequence. Other NAL units carry coded samples in the form of slices that belong to one of the picture types that are defined for that video compression standard.

All standards mentioned above include the concept of slices. A slice is video data that represents all or part of a coded video frame. So, a frame may comprise one slice or several. Each picture is partitioned into one or multiple slices. Each slice is independent in the sense that the information carried in the slice is coded without any dependency on data from other slices within the same picture. Therefore, slices can be processed independently during encoding and decoding. However, due to reduced exploitation of spatial redundancy, the coding efficiency usually decreases with increasing the number of slices used for a picture. Some information from other slices may be needed to apply the deblocking filter across slice boundaries.

Picture partitioning by slices serves three main purposes:

1) Error robustness: Loss of a slice does not affect the decoding process of other slices.

2) MTU Size matching: By restricting the number of bits in a slice, each slice can be kept within the maximum transmission unit (MTU) size commonly found in IP networks to avoid having a coded picture fragmented into multiple packets by the transport protocols.

3) Parallel processing: The picture is partitioned into units that can be processed in parallel. This is given by the fact that all slice-based encoding/decoding operations can be independently carried out in parallel. Indeed, slices are the only tool available for parallel processing in H.264/AVC.

In H.264/AVC, each slice includes a slice header followed by slice data. Slice header contains important information needed to decode the slice correctly. This information includes the slice type, address of the first macroblock in the slice, quantization parameter (QP) for the slice, or the like. Three main slice types exist depending on the coding type:

1) I slice: A slice in which all macroblocks of the slice are coded using intra prediction.

2) P slice: In addition to intra prediction, some macroblocks of the P slice can also be coded using inter prediction with at most one motion-compensated signal per prediction block.

3) B slice: In addition to the coding types available in a P slice, some macroblocks of the B slice can also be coded using inter prediction with two motion-compensated prediction signals per prediction block.

In H.265/HEVC, a slice consists of one or more multiple slice segments, where the first slice segment of a slice is called independent slice segment and is independent of other slice segments. The subsequent slice segments, if any, are called dependent slice segments since they depend on previous slice segments. Each coded slice segment includes a slice segment header followed by slice segment data. The slice segment header carries control information for the slice segment, and the slice segment data carries the coded samples. The independent slice header is referred to as the slice header since the information in this header pertains to all slice segments of the slice. Headers of dependent slice segments are drastically shortened, reducing the overhead caused by multiple slice headers.

While slices are the only tool that can be used for parallelization in H.264/AVC, both H.265/HEVC and H.266/VVC include other tools such as Wavefront Parallel Processing (WPP) and Tiles. Tiles are independently decodable rectangular regions of a picture that are encoded with some shared header information. Unlike slices, tiles typically do not form separate NAL units. The main purpose of tiles is to increase the capability for parallel processing, rather than provide error resilience. Tiles can additionally be used for the purpose of spatial random access to different regions of a picture. This feature makes tiles suitable for use in viewport-dependent delivery of immersive media. A viewport refers to the rectangular viewing region that is displayed to the user or the visible area of a rendering surface.

In HEVC (High Efficiency Video Coding), spatial prediction and context prediction of the entropy coding do not cross tile boundaries. However, for inter-picture prediction, a standard HEVC tile is allowed to reference to a tile in another region in previous pictures. The motion-constrained tile set (MCTS) technique constrains the inter-picture prediction processes within a specified set of tiles to reference only regions within the same set of tiles in previous pictures in decoding process. This constrains the motion vectors such that a sequence of tile sets become independent of the remaining tiles in a sequence of pictures. As a result of limiting the temporal inter-prediction of each tile, encoding efficiency slightly decreases while using MCTS. The MCTS technique enables selectively choosing different combinations of tiles, i.e., "bitstream extraction and merging", which is important for viewport-dependent delivery of immersive media. For example, in 360-degree video, at any moment a viewer usually sees only a small spatial portion of the entire coded video. Therefore, for transmission and/or decoding efficiency, a large spatial portion of the encoded video may not need to be transmitted and/or decoded. To be able to do that in an efficient and convenient manner, the bitstream needs to be coded in a way such that a region of the picture can be extracted and decoded independently without accessing the other regions. It is noted that omnidirectional/360-degree video is a video where a view in every direction is recorded at the same time, typically using a special rig of multiple cameras, or using a dedicated camera that contains multiple camera lenses embedded into the device.

VVC (versatile video coding) includes a new picture partitioning scheme called subpictures that allows achieving the same in a more flexible way. A subpicture is a coded rectangular region of a picture, which is either extractable (coded independently) or non-extractable. The former can be extracted using a sub-bitstream extraction process and can be merged with other subpicture sub-bitstreams. Functionally, subpictures are similar to MCTS in HEVC, as both allow the extraction of parts of a coded picture. Subpicture is a useful tool for 3DoF and 6DoF use-cases, where only a part of a complete scene is rendered at a given point in time. FIG. 1 shows a picture partitioned into 18 tiles, 24 slices and 24 subpictures. The tiles are labeled with "T" for tile and with "S" for slices. This picture is a revised figure from Bross et al. ["Overview of the Versatile Video Coding (VVC) Standard and Its Applications" IEEE Transactions on Circuits and Systems for Video Technology, October 2021, Vol 31 (10): pp. 3736-376]. In this example, each subpicture contains one slice.

Another topic of interest is Real-time Transport Protocol (RTP). RTP is intended for an end-to-end, real-time transfer of streaming media and provides facilities for jitter compensation and detection of packet loss and out-of-order delivery. RTP allows data transfer to multiple destinations through IP multicast or to a specific destination through IP unicast. The majority of the RTP implementations are built on top of the User Datagram Protocol (UDP). Other transport protocols may also be utilized. RTP is used in together with other protocols such as H.323 and Real Time Streaming Protocol (RTSP).

The RTP specification (RFC 3550) describes two protocols: RTP and RTCP. RTP is used for the transfer of multimedia data, and its companion protocol (RTCP) is used to periodically send control information and Quality of Service (QOS) parameters.

RTP sessions are typically initiated between client and server or between client and another client (or a multi-party topology) using a signaling protocol, such as H.323, the Session Initiation Protocol (SIP), or RTSP. These protocols typically use the Session Description Protocol (SDP) described in RFC 8866 to specify the parameters for the sessions.

RTP is designed to carry a multitude of multimedia formats, which permit the transport of new formats without revising the RTP standard. To this end, the information required by a specific application of the protocol is not included in the generic RTP header. For a class of applications (e.g., audio, video), an RTP profile may be defined. For a media format (e.g., a specific video coding format), an associated RTP payload format may be defined. Every instantiation of RTP in a particular application may require a profile and payload format specifications.

The profile defines the codecs used to encode the payload data and their mapping to payload format codes in the protocol field Payload Type (PT) of the RTP header. For example, the RTP profile for audio and video conferences with minimal control (RTP/AVP) is defined in RFC 3551. The profile defines a set of static payload type assignments, and a dynamic mechanism for mapping between a payload format, and a PT value using SDP. The latter mechanism is used for video codecs such as RTP payload format for H.264 defined in RFC 6184, RTP payload format for High Efficiency Video Coding (HEVC) defined in RFC 7798 and RTP payload format for Versatile Video Coding (VVC) defined in RFC 9328.

An RTP session is an association among a group of participants communicating with RTP. An RTP session may carry one or more RTP streams. Multiple RTP streams (e.g., audio and video) may use separate RTP sessions. The RTP specification recommends even port numbers for RTP, and the use of the next odd port number for an associated RTCP stream. A single port may be used for RTP and RTCP in applications that multiplex the protocols. Each RTP stream consists of RTP packets, which in turn include RTP header and payload pairs.

The RTP specification RFC 3550 ["RTP: A Transport Protocol for Real-Time Applications", 2003] provides a capability to extend the RTP header. Section 5.3.1 of RFC 3550 defines the header extension format and rules for its use. Header extensions may carry metadata in addition to the usual RTP header information, provided the RTP layer can function if that metadata is missing. RFC3550 states that RTP "is designed so that the header extension may be ignored by other interoperating implementations that have not been extended." The intent of this restriction is that RTP header extensions should not be used to extend RTP itself in a manner that is backward incompatible with non-extended implementations.

Additionally, the general mechanism for header extension specification, RFC 8285 ["A General Mechanism for RTP Header Extensions", 2017], provides the option to use a small number of extensions in each RTP packet, where the domain of possible extensions is large and registration is decentralized. RFC 3550 has two drawbacks in terms of header extensions: First, it permits only one header extension in a single RTP packet. Second, the specification provides no guidance as to how the 16-bit header extension identifiers are allocated to avoid collisions. RFC 8285 removes the limitations of header extension use in RFC 3550 by defining a backward-compatible and extensible means to carry multiple header extension elements in a single RTP packet and defining that these extension elements are named by URIs collected in an IANA registry.

RFC 8285 defines two variants of the extension: one-byte and two-byte headers. In the one-byte header form, each extension element must start with a byte containing an ID and a length. In the two-byte header form, each extension element starts with a byte containing an ID and a byte containing a length. The one-byte header form allows for data lengths between 1 and 16 bytes, by adding 1 to the signaled length value (thus, 0, zero, in the length field indicates that one byte of data follows). This allows for the important case of 16-byte payloads. This addition is not performed for the two-byte headers, where the length field signals data lengths between 0 (zero) and 255 bytes.

Real-time transport of immersive 360-degree video in IMS networks is a further topic. As part of its Release 17 work, 3GPP SA WG4 developed the feature Immersive Teleconferencing and Telepresence for Remote Terminals (ITT4RT) and enabled its support for MTSI terminals in 3GPP TS 26.114, Annex Y. ITT4RT addresses scenarios with two-way audio and one-way immersive 360-degree video. This could be for example a scenario, in which a remote user wearing an HMD and participating in a conference sends audio and optionally 2D video while receiving stereo or immersive audio and immersive 360-degree video captured by an omnidirectional camera in a conference room.

Figure 2:
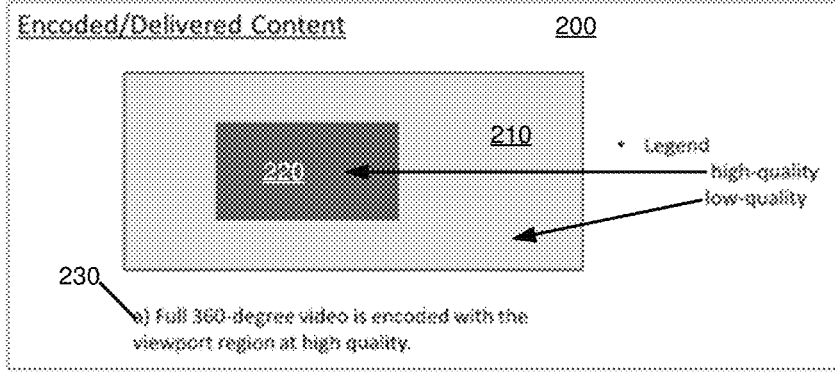
FIG. 2 illustrates a 360-degree video optimized for a viewport.

ITT4RT clients are further classified into two types to distinguish between the capabilities for sending or receiving immersive video: (i) ITT4RT-Tx client, which is only capable of sending immersive 360-degree video, and (ii) ITT4RT-Rx client, which is only capable of receiving immersive 360-degree video. An ITT4RT-Tx client may offer Viewport Dependent Processing (VDP) for delivering bandwidth-efficient 360-degree video to ITT4RT-Rx clients when both ends have successfully negotiated the required capabilities. A non-exhaustive list of ways (1-4) to support VDP is given below, as described in 3GPP TR 26.962:

1. 360-degree video optimized for the viewport: Full 360-degree video, which has been optimized for the current viewport, is delivered to the receiver. This is achieved by encoding the viewport region at a higher quality than the other regions. Bitrate savings are limited in this case, since the full 360-degree video is sent. The figure in FIG. 2 illustrates this approach. The encoded/delivered content 200 includes a lower-quality portion in a non-viewport region 210 and a higher-quality portion in a viewport region 220, for the full (see reference 230) 360-degree video that is encoded with the viewport region 220 at higher quality. Low quality refers here to the perceived visual fidelity. So, non-viewport region 210 has lower perceived visual fidelity than the viewport region 220. The implication is that the lower quality portion will typically use fewer bits per pixel for encoding than the higher quality portion 2. Tiled video with multiple quality levels. See FIG. 3, which is split into FIGS. 3A, 3B, and 3C, and illustrates a tiled video with multiple quality levels, where FIG. 3A illustrates tiled encoding of 360-degree video of low quality, FIG. 3B illustrates tiled encoding of 360-degree video of high quality, and FIG. 3C illustrates tile qualities in a delivered stream, and higher quality tiles in the viewport region 220. The sender may create both a tiled low-quality and tiled high-quality version of the 360-degree video. The delivered stream consists of high-quality tiles for the viewport region 220 and low-quality tiles for the non-viewport region 210, se FIG. 3C.

This can be achieved either by mixing the tiles encoded with high and low fidelity (mixed-quality tiled encoding), or by mixing tiles encoded with high and low resolution (mixed-resolution tiled encoding). Mixed-resolution may be used to increase the effective viewport resolution of viewport for devices with limited decoding capability (e.g., effective 6K viewport resolution with 4K viewport resolution).

Figure 4:
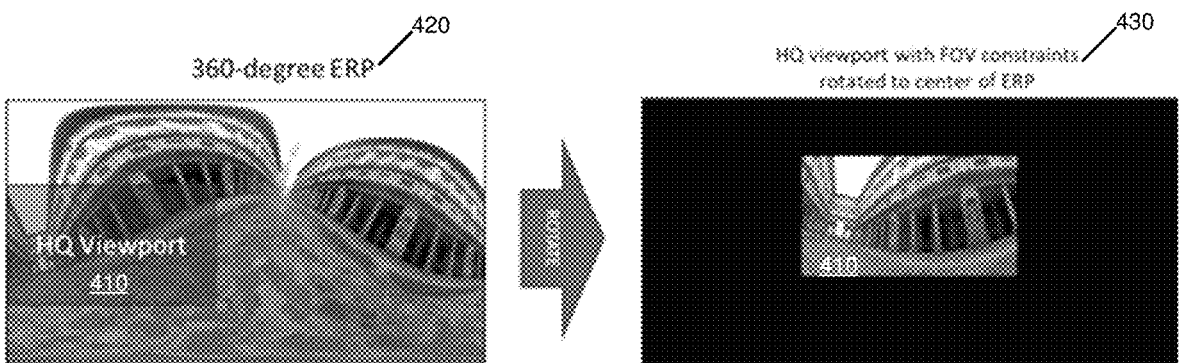
FIG. 4 illustrates rotation of a 360-degree video (with respect to the original capture) to bring a viewport to a center of the viewport to ensure the same resolution for the viewport region.

3. Viewport-only delivery: For maximum bandwidth savings, the ITT4RT-Tx client may deliver only an extracted high-quality region corresponding to the viewport of the ITT4RT-Rx client. If the viewport region is extracted from a projected picture using, e.g., equirectangular projection (ERP), the resolution would change depending on where the viewport is located on the picture. To prevent changing resolution, the ITT4RT-Tx client may rotate the sphere to re-orient the selected viewport to the center of the projected picture. FIG. 4 illustrates a rotation of a 360-degree video (with respect to the original capture) to bring a viewport to the center of another viewport to ensure the same resolution for the viewport region. In particular, there is an HQ (high quality) viewport 410 in the 360-degree ERP 420 that is placed into the HQ viewport with POV constraints related to the center of the ERP. See reference 430.

For this delivery mode, the receiver can apply one of the following two rendering approaches:

a) Sphere-locked: The sender can signal the rotation information to the receiver using the rotation SEI message. The receiver can then reverse the rotation before rendering.

b) Viewport-locked: The received viewport is not mapped to the original capture orientation, i.e., there is no need to reverse the rotation. Instead, the receiver can render the received video as viewport locked, i.e., centered at the center of the viewport/display. This mode is suitable for the users following the viewport orientation of another device and any 2D display devices.

4. High-quality viewport with low-quality background: A viewport-only solution can be combined with low-quality viewport-independent 360-degree video as background to deliver a more continuous viewing experience in case of head motion. The low-quality background is frame packed with the viewport region and delivered as a single stream. This method delivers redundant content in the viewport region, since the viewport is delivered both in the high-quality version and as part of the background video.

Figure 5:
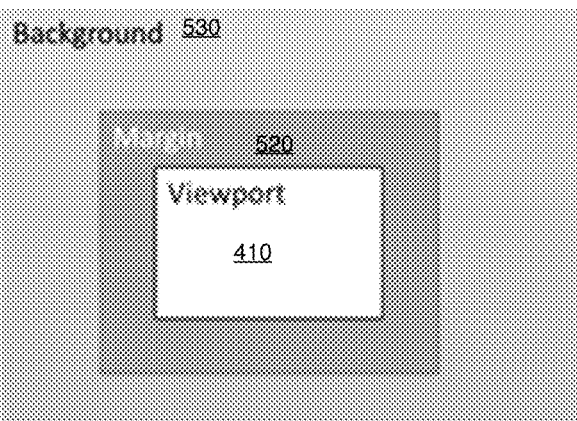
FIG. 5 illustrates an example where viewport margins are extended around a viewport evenly.

Concerning viewport margins, when VDP is used, the user's viewport may require an update due to head motion. Motion-to-high-quality delay is the amount of time it takes for the new viewport to reach quality comparable to that of the viewport before the head motion. An ITT4RT-Tx client that supports VDP may use viewport margins to minimize this delay, and also to reduce the need for frequent viewport updates. Viewport margins may be extended around viewport evenly, as shown in FIG. 5, or unevenly. FIG. 5 illustrates an example where viewport margins 520 are extended around the viewport 410 evenly, and as part of the background 530.

Figures 6A, 6B, 6C, 6D:
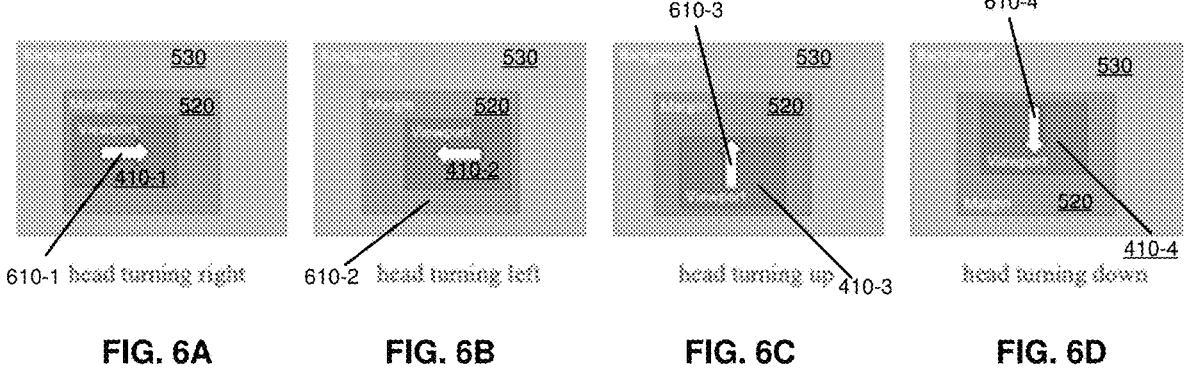
FIGS. 6A, 6B, 6C, and 6D illustrate uneven extensions of margins that can be used based on the user's (predicted) head motion.

Uneven extensions of margins can be used based on the user's (predicted) head motion, as shown in FIG. 6. For example, if the user's head is turning right, it may be more sensible to have a larger margin region to the right of the current viewport. See FIG. 6A, where the user's head is turning right as per 610-1 and there is a larger margin region to the right of the current viewport 410-1. In FIG. 6B, the user's head is turning left as per 610-2 and there is a larger margin region to the left of the current viewport 410-2. In FIG. 6C, the user's head is turning upward as per 610-3 and there is a larger margin region to the top of the current viewport 410-3. In FIG. 6D, the user's head is turning downward as per 610-4 and there is a larger margin region to the top of the current viewport 410-4. Other factors such as audio input, motion tracking or application-level functions can be used to set the viewport margins in a beneficial way.

An additional topic is a 5G system overview. 5G Core Network (5GC) relies on a "Service-Based Architecture" (SBA) framework, where the architecture elements are defined in terms of "Network Functions" (NFs) rather than by "traditional" Network Entities. Via interfaces of a common framework, any given NF offers its services to all the other authorized NFs and/or to any "consumers" that are permitted to make use of these provided services. Such an SBA approach offers modularity and reusability.

Figure 7:
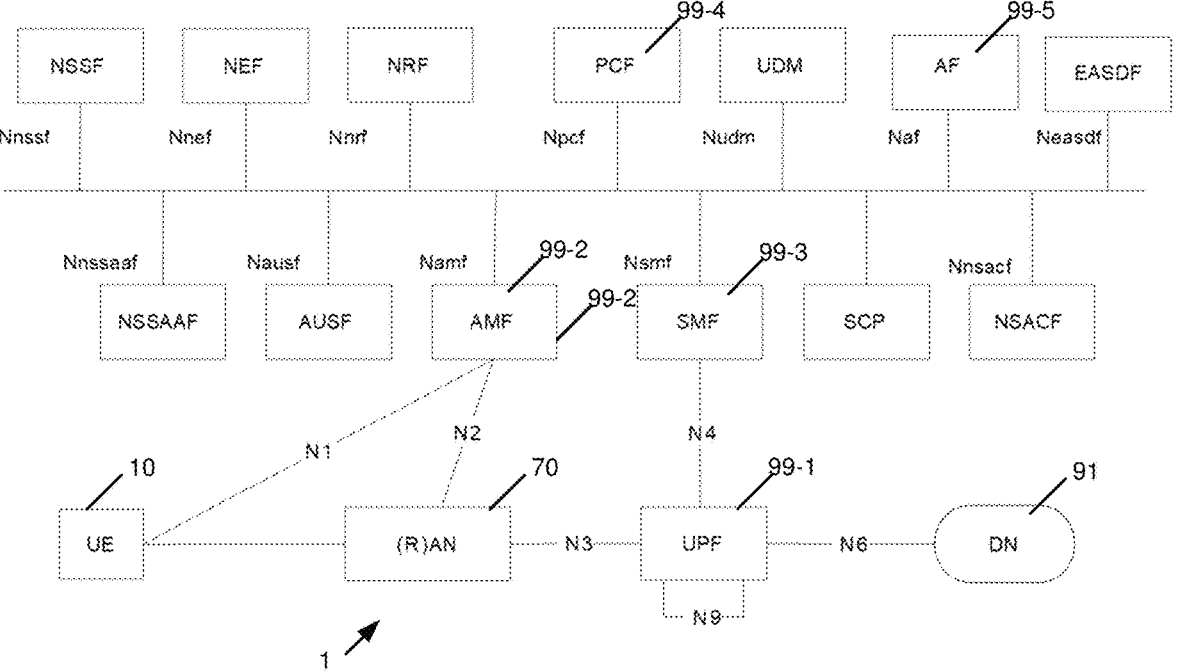
FIG. 7 illustrates an example of system architecture for the 5G System (5GS)

FIG. 7 illustrates an example of system architecture for the 5G System (5GS). The figure is extracted from 3GPP TS 23.501 "System architecture for the 5G System (5GS)" shows the main NFs. The UE 10 is a wireless, typically mobile, device that connects to the RAN node 70, which provides access by the UE 10 to the cellular network 1. The RAN node 70 is also referred to as AN 70.

In the figure, the User Plane elements involved in the transport of the user data are shown in the bottom part, whereas the upper part of the figure shows the NFs 99 within the signaling/control plane. Functionalities of the NFs 99 relevant for examples herein are summarized below.

User Plane Function (UPF) 99-1 forwards the traffic between the Radio Access Network (RAN) node 70 and the Data Network (DN) 91. In addition to IP packet forwarding, the UPF 99-1 is responsible for policy enforcement, lawful intercept, traffic usage measurement and QoS policing. UPF 99-1 is also responsible for tunneling (i.e., encapsulating and decapsulating) packets as they are transmitted to and from base stations over the N3 interface.

Access and Management Function (AMF) 99-2 is responsible for connection and mobility management, access authorization and location services. AMF 99-2 authorizes access when a UE 10 first connects to one of the local base stations and then tracks which base station currently serves each UE 10.

Session Management Function (SMF) 99-3 manages each UE session, including IP address allocation, control aspects of QoS and control aspects of user-plane routing.

Policy Control Function (PCF) 99-4 manages the policy rules and controls that the user data traffic does not exceed the negotiated bearer capacities.

Application Function (AF) 99-5 exposes the application layer for interaction with 5G NFs 99 and network resources. It allows NF service consumers to subscribe to periodic and/or event-driven notifications. UE application events exposed via AF 99-5 include Quality of Experience (QoE) metrics, consumption reports and network assistance invocations.

Description of the other NFs 99 is available in standards. These other NFs 99 are not further described herein.

Figure 8:
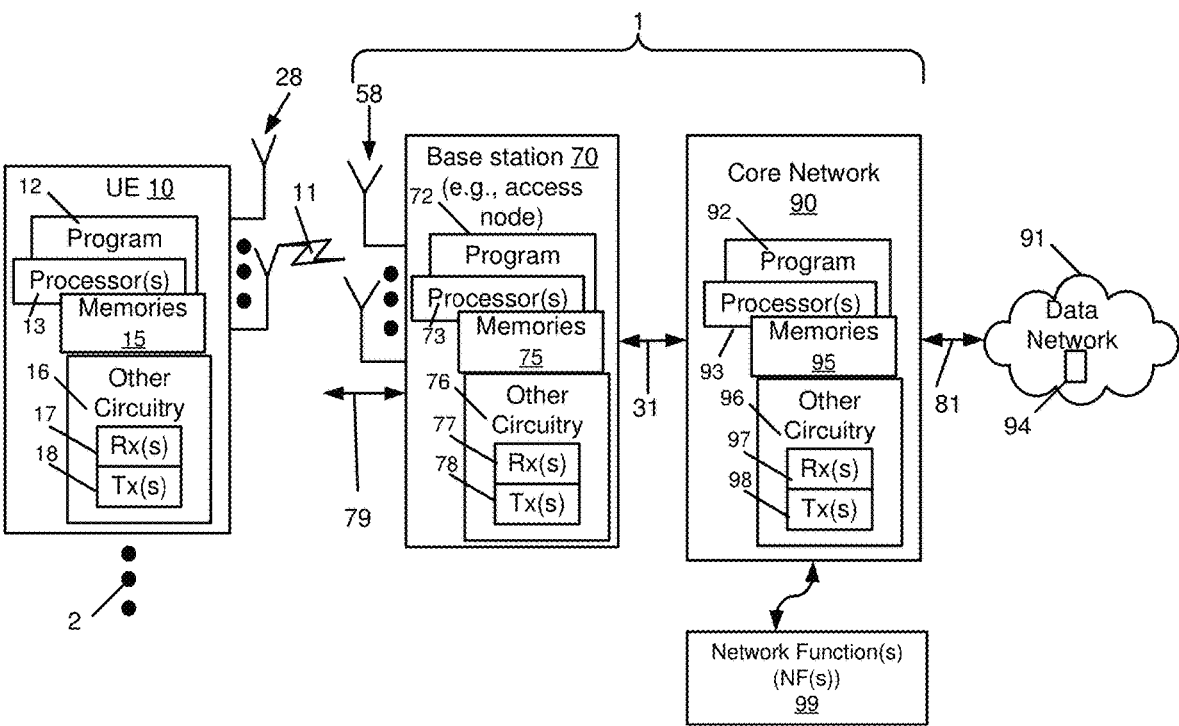
FIG. 8 is a block diagram of one possible and non-limiting exemplary system in which the exemplary embodiments may be practiced.

Turning to FIG. 8, this figure shows a block diagram of one possible and non-limiting example of a cellular network 1 that is connected to a user equipment (UE) 10. A number of network elements are shown in the cellular network of FIG. 8: a base station 70; and a core network 90.

In FIG. 8, a user equipment (UE) 10 is in wireless communication via radio link 11 with the base station 70 of the cellular network 1. A UE 10 is a wireless communication device, such as a mobile device, that is configured to access a cellular network. The UE 10 is illustrated with one or more antennas 28. The ellipses 2 indicate there could be multiple UEs 10 in wireless communication via radio links with the base station 70. The UE 10 includes one or more processors 13, one or more memories 15, and other circuitry 16. The other circuitry 16 includes one or more receivers (Rx(s)) 17 and one or more transmitters (Tx(s)) 18. A program 12 is used to cause the UE 10 to perform the operations described herein. For a UE 10, the other circuitry 16 could include circuitry such as for user interface elements (not shown) like a display.

The base station 70, as a network element of the cellular network 1, provides the UE 10 access to cellular network 1 and to the data network 91 via the core network 90 (e.g., via a user plane function (UPF) of the core network 90). As such, the base station 70 may be considered to be an access node, which provides access by UE(s) 10 to the cellular network 1. The base station 70 is illustrated as having one or more antennas 58. In general, the base station 70 may be referred to as RAN node 70, although many will make reference to this as a gNB (gNode B, a base station for NR, new radio) instead. There are, however, many other examples of RAN nodes including an eNB (evolved Node B) or TRP (Transmission-Reception Point). The base station 70 includes one or more processors 73, one or more memories 75, and other circuitry 76. The other circuitry 76 includes one or more receivers (Rx(s)) 77 and one or more transmitters (Tx(s)) 78. A program 72 is used to cause the base station 70 to perform the operations described herein.

It is noted that the base station 70 may implement a different radio access technology, such as Wi-Fi (a wireless networking protocol that devices use to communicate without direct cable connections). In the case of Wi-Fi, the link 11 could be characterized as a wireless link. More specifically, link 11 refers to the access technology from the device to base station. If that is the case, the link 11 can be a 3GPP access network like 5G NG-RAN and LTE, or a non-3GPP access network like WiFi. In a more general sense, the link 11 can even be a fixed/wireline access.

Two or more base stations 70 communicate using, e.g., link(s) 79. The link(s) 79 may be wired or wireless or both and may implement, e.g., an Xn interface for 5G (fifth generation), an X2 interface for LTE (Long Term Evolution), or other suitable interface for other standards.

The cellular network 1 may include a core network 90, as a second network element or elements, that may include core network functionality, and which provide connectivity via a link or links 81 with a data network 91, such as a telephone network and/or a data communications network (e.g., the Internet). The core network 90 includes one or more processors 93, one or more memories 95, and other circuitry 96. The other circuitry 96 includes one or more receivers (Rx(s)) 97 and one or more transmitters (Tx(s)) 98. A program 92 is used to cause the core network 90 to perform the operations described herein.

The core network 90 could be a 5GC (5G core network). The core network 90 can implement or comprise multiple network functions (NF(s)) 99, and the program 92 may comprise one or more of the NFs 99. A 5G core network may use hardware such as memory and processors and a virtualization layer. It could be a single standalone computing system, a distributed computing system, or a cloud computing system. The NFs 99, as network elements, of the core network could be containers or virtual machines running on the hardware of the computing system(s) making up the core network 90.

Core network functionality for 5G may include multiple NFs 99 as illustrated in FIG. 7. These are merely exemplary core network functionality that may be provided by the core network 90, and note that both 5G and LTE core network functionality might be provided by the core network 90. The base station 70 is coupled via a backhaul link 31 to the core network 90. The base station 70 and the core network 90 may include an NG (Next Generation) interface for 5G, or an S1 interface for LTE, or other suitable interface for other radio access technologies for communicating via the backhaul link 31.

In the data network 91, there is a computer-readable medium 94. The computer-readable medium 94 contains instructions that, when downloaded and installed into the memories 15, 75, or 95 of the corresponding UE 10, base station 70, and/or core network element(s) 90, and executed by processor(s) 13, 73, or 93, cause the respective device to perform corresponding actions described herein. The computer-readable medium 94 may be implemented in other forms, such as via a compact disc or memory stick.

The programs 12, 72, and 92 contain instructions stored by corresponding one or more memories 15, 75, or 95. These instructions, when executed by the corresponding one or more processors 13, 73, or 93, cause the corresponding apparatus 10, 70, or 90, to perform the operations described herein. The computer readable memories 15, 75, or 95 are circuitry and may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 15, 75, and 95 may be means for performing storage functions. The processors 13, 73, and 93, are circuitry and may be of any type suitable to the local technical environment. For example, these processors may include one or more of general-purpose computers, special purpose computers, microprocessors, digital signal processors (DSPs), processors based on a multi-core processor architecture, and may also include specialized circuits such as field-programmable gate arrays (FPGAs), application specific circuits (ASICs), signal processing devices and other devices, or combinations of these devices, as non-limiting examples. The processors 13, 73, and 93 may be means for causing their respective apparatus to perform functions, such as those described herein.

The receivers 17, 77, and 97, and the transmitters 18, 78, and 98 may implement wired or wireless interfaces. The receivers and transmitters may be grouped together as transceivers.

The cellular network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities (such as network functions 99) that result from the network virtualization are still implemented, at some level, using hardware such as processors 73 and/or 93 and memories 75 and/or 95, and also such virtualized entities create technical effects.

In general, the various embodiments of the user equipment 10 can include, but are not limited to, cellular telephones (such as smart phones, mobile phones, cellular phones, voice over Internet Protocol (IP) (VOIP) phones, and/or wireless local loop phones), tablets, portable computers, vehicles or vehicle-mounted devices for, e.g., wireless V2X (vehicle-to-everything) communication, image capture devices such as digital cameras, gaming devices, music storage and playback appliances, Internet appliances (including Internet of Things, IoT, devices), IoT devices with sensors and/or actuators for, e.g., automation applications, as well as portable units or terminals that incorporate combinations of such functions, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. That is, the UE 10 could be any end device that may be capable of wireless communication. By way of example rather than limitation, the UE may also be referred to as a communication device, terminal device (MT), a Subscriber Station (SS), a Portable Subscriber Station, a Mobile Station (MS), or an Access Terminal (AT).

Figure 9:
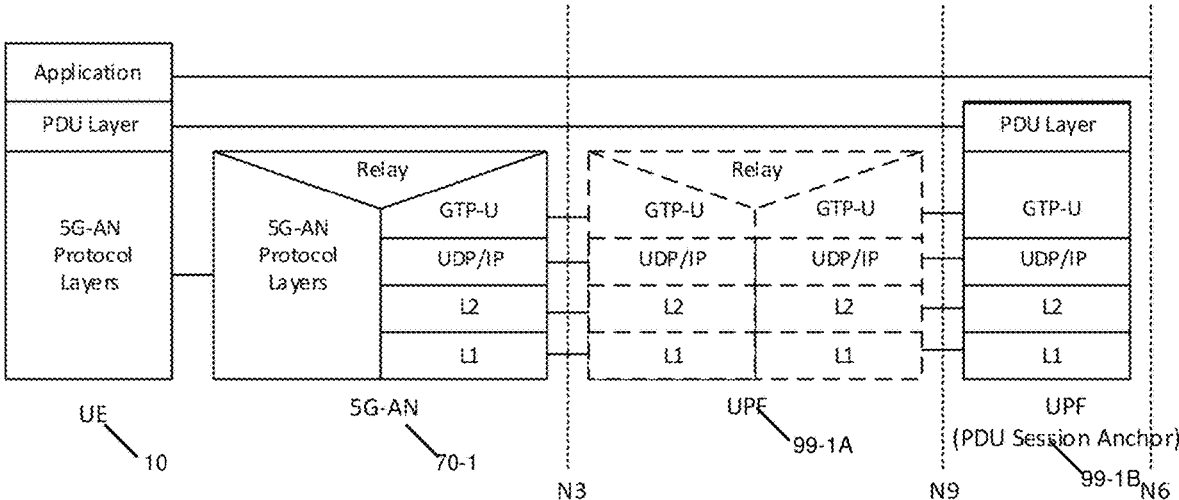
FIG. 9 shows the User Plane Protocol Stack between the UE, the 5G Access Network (AN) and the UPF within a Protocol Data Unit (PDU) session.

FIG. 9 shows the User Plane Protocol Stack between the UE 10, the 5G Access Network (AN) 70-1 and the UPF 99-1B within a Protocol Data Unit (PDU) session. A PDU session is defined as an association between the UE and a DN that provides a PDU connectivity service. This example has two UPFs 99-1A and 99-1B, illustrating that there might be intermediate UPFs on the network path. The UPF 99-1B is the one which terminates the N6 interface of a PDU session towards the Data Network (DN). It is therefore referred to as a PDU session anchor.

The 5G-AN can either be a 3GPP NG-RAN or an untrusted non-3GPP access to 5GC. NG-RAN is the "new generation" RAN for 5G, providing both NR and E-UTRA ("LTE") radio access. In this document, the terms NG-RAN and RAN are used interchangeably.

A PDU Layer corresponds to the PDU carried between the UE and the DN over the PDU session. For example, if the PDU session type is IPv4, a PDU corresponds to the IPv4 packets. GPRS Tunneling Protocol for the user plane (GTP-U) supports tunneling user data over the interface N3 between the RAN and UPF and N9 between different UPFs of the 5GC. This layer also carries marking associated with a QoS flow as defined in clause 5.7 of 3GPP TS 23.501. L2 is also called the "Data Link Layer" and the L1 is the "Physical Layer".

Another topic of interest is volumetric video, which is a type of video that captures a 3D representation of a real-world object or scene, allowing the viewers to explore the object or scene from different viewpoints. While 360-degree video contains views in every direction, the coded video comprises chroma and luma information, while volumetric video also comprises depth information, allowing at least partial reconstruction of a three-dimensional volume of a scene by a decoder. Unlike a three degrees of freedom (3DoF) experience, an immersive six degrees of freedom (6DoF) representation enables a larger viewing-space, wherein viewers have both translational and rotational freedom of movement. In a 3DoF visual experience, content is presented to viewers as if they were positioned at the center of a scene, looking outwards, with all parts of the content positioned at a constant distance. By contrast, 6DoF experiences allow viewers to move freely in the scene and experience the content from various viewpoints. Contrarily to 3DoF, 6DoF videos enable perception of motion parallax, where the change in relative geometry between objects is reflected with the pose of the viewer.

There are many ways to capture and represent a volumetric frame. The format used to capture and represent the frame depends on the processing to be performed on it, and the target application using it. Some exemplary representations are listed below.

1) A volumetric frame can be represented as a point cloud. A point cloud is a set of unstructured points in 3D space, where each point is characterized by its position in a 3D coordinate system (e.g., Euclidean), and some corresponding attributes (e.g., color information provided as RGBA value, or normal vectors).

2) A volumetric frame can be represented as images, with or without depth, captured from multiple viewpoints in 3D space. In other words, the volumetric frame can be represented by one or more view frames (where a view is a projection of a volumetric scene on to a plane (the camera plane) using a real or virtual camera with known/computed extrinsics and intrinsics). Each view may be represented by a number of components (e.g., geometry, color, transparency, and occupancy picture), which may be part of the geometry picture or represented separately.

3) A volumetric frame can be represented as a mesh. A mesh is a collection of points, called vertices, and connectivity information between vertices, called edges. Vertices along with edges form faces. The combination of vertices, edges and faces can uniquely approximate shapes of objects.

Depending on the capture, a volumetric frame can provide viewers the ability to navigate a scene with six degrees of freedom, i.e., both translational and rotational movement of their viewing pose (which includes yaw, pitch, and roll). The data to be coded for a volumetric frame can also be significant, as a volumetric frame can contain many objects, and the positioning and movement of these objects in the scene can result in many disoccluded regions. Furthermore, the interaction of light and materials in objects and surfaces in a volumetric frame can generate complex light fields that can produce texture variations for even a slight change of pose.

A sequence of volumetric frames is a volumetric video. Due to large amount of information, storage and transmission of a volumetric video requires compression. A way to compress a volumetric frame can be to project the 3D geometry and related attributes into a collection of 2D images along with additional associated metadata. The projected 2D images can then be coded using 2D video and image coding technologies, for example ISO/IEC 14496-10 (H.264/AVC) and ISO/IEC 23008-2 (H.265/HEVC), and ISO/IEC 23090-3 (H.266/VVC). The metadata can be coded with technologies specified in specification such as ISO/IEC 23090-5. The coded images and the associated metadata can be stored or transmitted to a client that can decode and render the 3D volumetric frame.

A further technology of interest is Visual Volumetric Video-based Coding (V3C)-ISO/IEC 23090-5. The introduction of unconstrained viewer translation and motion parallax increases the amount of data required to describe the volumetric scene. Hence, the Motion Picture Experts Group (MPEG) has specified the Visual Volumetric Video-based Coding (V3C) standard ISO/IEC 23090-5 (ISO/IEC 23090-5, 2021) to efficiently code dynamic volumetric visual scenes. This standard caters to virtual reality, augmented reality, and mixed reality applications, such as gaming, sports broadcasting, motion picture productions, and telepresence. Like V3C coding standards, the systems aspects for volumetric content leverage existing technologies and frameworks for traditional 2D video. The ISO/IEC 23090-10 standard defines how V3C-coded content may be stored in an ISO base media file format (ISOBMFF) (ISO/IEC 14496-12, 2020) container as timed and non-timed data, providing the ability to multiplex V3C *media* with other types of media such as audio, video, or image. Moreover, the standard defines extensions to the Dynamic Adaptive Streaming over Hypertext Transfer Protocol (HTTP) (DASH) (ISO/IEC 23009-1, 2019) and MPEG Media Transport (MMT) (ISO/IEC 23008-1, 2017) frameworks to enable delivery of V3C-coded content over a network leveraging existing multimedia delivery infrastructures.

The V3C standard defines a generic mechanism for coding volumetric video and can be used by applications targeting different flavors of volumetric content, such as point clouds, immersive video with depth, or even mesh representations of visual volumetric frames. So far, MPEG has specified two applications that utilize V3C: video-based point cloud compression (V-PCC), also specified in ISO/IEC 23090-5 (ISO/IEC 23090-5, 2021); and MPEG immersive video (MIV) specified in ISO/IEC 23090-12 (ISO/IEC 23090-12, 2021). V3C compresses volumetric video by taking advantage of the performance and ubiquity of traditional 2D video coding technologies. To achieve this, each volumetric frame is transformed from its 3D representation into multiple 2D representations and associated metadata known as atlas data in the V3C specification. After the conversion from 3D to 2D, the resulting 2D representations are compressed using traditional video codecs while atlas data are compressed with a separate encoding mechanism defined in ISO/IEC 23090-5 (ISO/IEC 23090-5, 2021).

ISO/IEC 23090-5 specifies the syntax, semantics, and process for coding volumetric video. The specified syntax is designed to be generic so that the syntax can be reused for a variety of applications. Point clouds, immersive video with depth, and mesh representations can all use ISO/IEC 23090-5 standard with extensions that deal with the specific nature of the final representation. The purpose of the specification is to define how to decode and interpret the associated data (for example atlas data in ISO/IEC 23090-5) which tells a renderer how to interpret 2D frames to reconstruct a volumetric frame.

MIV and V-PCC use a number of V3C syntax elements with slightly modified semantics. An example of how the generic syntax element can be differently interpreted by the application is pdu_projection_id.

1) In case of V-PCC the syntax element, pdu_projection_id specifies the index of the projection plane for the patch. There can be 6 or 18 projection planes in V-PCC, and they are implicit, i.e., pre-determined.

2) In case of MIV, pdu_projection_id corresponds to a view ID, i.e., identifies which view the patch originated from. View IDs and their related information are explicitly provided in MIV view parameters list and may be tailored for each content. For the sake of this invention, view ID and camera ID should be considered equivalent.

MPEG 3DG (ISO SC29 WG7) group has started work on a third application of V3C—the dynamic mesh compression. It is also envisaged that mesh coding will re-use V3C syntax as much as possible and can also slightly modify the semantics.

To differentiate between applications of V3C bitstream, that allow a client to properly interpret the decoded data, V3C uses the ptl_profile_toolset_idc parameter.

VVC subpictures contain one or more complete slices, and a slice in VVC contains one or more complete tiles or an integer number of consecutive complete coding tree unit rows within a single tile. In this document, subpictures are considered in the context of V3C. See, e.g., Maria Santamaria et al., "Coding of volumetric content with MIV using VVC subpictures", arXiv: 2206.02588v1 [eess.IV] 6 Jun. 2022, for additional information regarding subpictures considered in the context of V3C.

Subpictures allow the creation of an efficient bitstream with independently extractable parts. The signaling overhead to indicate the independent accessibility is marginal, considering the large amounts of data that is to be coded. The use of subpictures in V3C MIV allows: (1) viewport-dependent decoding and rendering; (2) scalable rendering of either a 3DoF or 6DoF variation of the content from a single bitstream; (3) parallel encoding of atlases (video frames consisting of patches); and (4) minimizing the number of streams to be synchronously decoded and rendered. The latter requires frame-packing the subpictures.

PDU Set based handling in 5GC is now described. 3GPP TS 23.501 defines PDU Set as follows: A PDU Set is one or more PDUs carrying the payload of one unit of information generated at the application level (e.g., frame(s) or video slice(s) or the like for extended Reality (XR) Services). All the PDUs of a PDU set are transmitted within the same QoS flow.

In addition to the PDU related service information, the AF may provide PDU Set related assistance information for dynamic Policy and Charging Control (PCC) control. AF-provided PDU Set QoS Parameters and Protocol Description may be used in determining PCC Rules by the PCF.

The PCF generates a PCC rule containing the PDU Set QoS parameters (PSER, PSDB and PSIHI) and the SMF determines a QoS Profile for the QoS Flow. Alternatively, the SMF may be configured to support PDU Set QoS without receiving PCC rules from a PCF.

A QOS Flow may be enabled with PDU Set based QoS handling. In this case, the QoS profile may also include the PDU Set QoS Parameters. PDU Set QoS Parameters are used to support PDU Set based QoS handling in the NG-RAN. The following PDU Set QoS Parameters are specified:

1) PDU Set Delay Budget (PSDB).
2) PDU Set Error Rate (PSER).
3) PDU Set Integrated Handling Information (PSIHI).

The PDU Set Delay Budget (PSDB) defines an upper bound for the delay that a PDU Set may experience for the transfer between the UE and the N6 termination point at the UPF, i.e., the duration between the reception time of the first PDU (at the N6 termination point for DL or the UE for UL) and the time when all PDUs of a PDU Set have been successfully received (at the UE for DL or N6 termination point for UL). PSDB applies to the DL PDU Set received by the PSA UPF over the N6 interface, and to the UL PDU Set sent by the UE.

The PDU Set Error Rate (PSER) defines an upper bound for the rate of PDU Sets that have been processed by the sender of a link layer protocol (e.g., RLC in RAN of a 3GPP access) but that are not successfully delivered by the corresponding receiver to the upper layer (e.g., PDCP in RAN of a 3GPP access). Thus, the PSER defines an upper bound for a rate of non-congestion related PDU Set losses. The purpose of the PSER is to allow for appropriate link layer protocol configurations (e.g., RLC and HARQ in RAN of a 3GPP access).

The PDU Set Integrated Handling Information (PSIHI) indicates whether all PDUs of the PDU Set are needed for the usage of the PDU Set by the application layer in the receiver side. PSIHI is an optional parameter.

Protocol description indicates transport protocol (e.g., RTP, SRTP), transport protocol header extensions (e.g., RTP Header Extension for PDU Set Marking as defined in 3GPP TS 26.522), payload type and format (e.g., H.264, H.265), and format parameters (e.g., H.264 profile level and packetization mode) used by the service data flow.

Based on SMF instructions, the UPF may identify the PDU Sets, according to the Protocol Description in Packet Detection Rules (PDRs), to derive the PDU Set Information for downlink (DL) traffic and send it to RAN via DL GTP-U header of each PDU identified as belonging to a PDU Set.

The PDU Set identification can be done by UPF implementation or by detecting RTP/SRTP header or payload. If the UPF receives a PDU that does not belong to a PDU Set based on Protocol Description for PDU Set identification, then the UPF still maps the PDU to a PDU Set and determines the PDU Set Information. In this case, it is assumed that the UPF determines the PDU Set Importance value based on pre-configuration.

The PDU Set Information comprises the following:

1) PDU Set Sequence Number;
2) Indication of End PDU of the PDU Set;
3) PDU Sequence Number within a PDU Set;
4) PDU Set Size in bytes; and
5) PDU Set Importance, which identifies the relative importance of a PDU Set compared to other PDU Sets within a QoS Flow.

The NG-RAN may use the Priority Level (see clause 5.7.3.3 of 3GPP TS 26.522) across QoS Flows and PDU Set Importance within a QoS Flow for PDU Set level packet discarding in presence of congestion.

In addition to considering the PDU Set Importance within a QoS Flow, NG-RAN could also consider the relative PDU Set Importance across QoS Flows of the same Priority Level when determining which PDU Set needs to be discarded, which is up to implementation and configuration of operator.

RTP header extension for PDU set marking is described now. 3GPP TS 26.522 defines the RTP Header Extension for PDU Set marking can be used by an Application Server (AS), MRF or a sender UE that sends media to a receiver UE over RTP.

The semantics of the fields of the RTP Header Extension for PDU Set marking are defined as follows:

1) End PDU of the PDU Set [E] (1 bit): This field is a flag that shall be set to 1 for the last PDU of the PDU Set and set to 0 for all other PDUs of the PDU Set.

2) End of Data Burst [EDB] (3 bits): The EDB field is 3 bits in length and indicates the end of a Data Burst. The 3 bits encode the End of Data Burst indication as per the encoding and guidelines provided in Clause 4.4.2.6.1 of 3GPP TS 26.522.

3) PDU Set Importance [PSI] (4 bits): The PDU Set Importance field indicates the importance of this PDU Set compared to other PDU Sets within the same QoS flow. Lower values shall indicate a higher importance PDU Set with the highest importance PDU Set indicated by 0 and the lowest importance PDU Set indicated by 15.

4) PDU Set Sequence Number [PSSN] (10 bits): The field encodes the sequence number of the PDU Set to which the current PDU belongs acting as a 10-bit numerical identifier for the PDU Set.

5) PDU Sequence Number within a PDU Set [PSN] (6 bits): The sequence number of the current PDU within the PDU Set. The PSN shall be set to 0 for the first PDU in the PDU Set and incremented monotonically for every PDU in the PDU set in order of transmission from the sender.

6) PDU Set Size [PSSize] (24 bits): The PDU Set Size indicates the total size of all PDUs of the PDU Set to which this PDU belongs. This field is optional and subject to an SDP signaling offer/answer negotiation, where the Application Server may indicate whether it will be able to provide the size of the PDU Set for that RTP stream. If not enabled, the field should not be present. If enabled, but the Application Server is not able to determine the PDU Set Size for a particular PDU Set, it should set the value to 0 in all PDUs of that PDU Set. The PSSize shall indicate the size of a PDU Set including RTP/UDP/IP header encapsulation overhead of its corresponding PDUs. The PSSize is expressed in bytes.

Figures 10, 11:
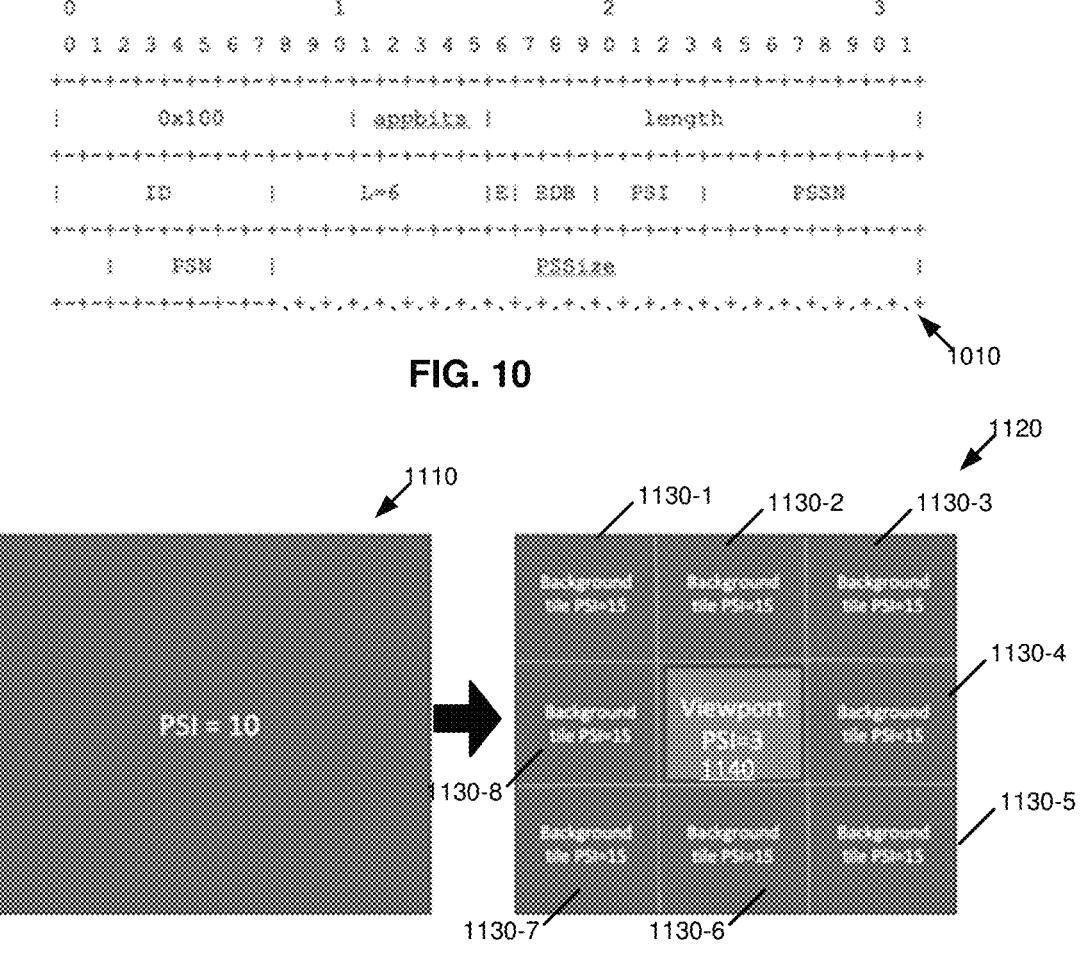
FIG. 10 illustrates a two-byte format for a header extension.
FIG. 11 illustrates left and right figures showing a video frame transmitted at a certain time point, but with different PDU Set Importance (PSI) values used.

The two-byte format (according to RFC 8285) for the header extension 1010 is defined in FIG. 10. The header extension 1010 is the whole figure. Two-byte format means ID and L fields together occupy two bytes, not the length of the whole extension.

3GPP TS 26.522 also contains a set of guidelines for setting the PDU Set Importance (PSI) and PDU Set Size (PSSize) and End of Data Burst (EDB) fields.

Discussed now is PDU Set Importance. 3GPP TS 26.522 v0.1.1 includes the following general information on the guidelines for the PSI. This material is between opening and closing quotation marks.

"4.4.2.6.2.1 General

PDU Set Importance (PSI) field can be used by the RAN to discard PDU sets. PDU sets with higher PSI value are more likely to be discarded.

The PDU sets that contain audio data should be set with highest importance compared with other media PDU sets.

NOTE 1: PDU sets that carry immersive audio data are not set with highest importance compared with other media PDU sets. The importance value of immersive audio PDU sets is FFS.

The PDU sets that contain the reference frames present in the video bitstream should be set with higher importance compared with PDU sets that contain non-reference frames.

NOTE 2: It is assumed that the video bitstream uses referencing structures that have no coding delay caused by out-of-order output, as typically done for low-delay applications.

The following clauses provide the guidelines on setting the PSI field in a PDU set RTP header extension for the 3GPP video codecs. For specific PSI value ranges, refer to clause 4.4.2.6.2.5."

There are problems that currently exist in these areas. For instance, the present PDU Set definition in 3GPP TS 23.501 does not limit a PDU Set to be a video frame or slice, based on this definition: PDU Set: One or more PDUs carrying the payload of one unit of information generated at the application level (e.g., frame(s) or video slice(s) or the like for extended Reality (XR) Services). All the PDUs of a PDU set are transmitted within the same QoS Flow.

Furthermore, within a PDU Set, all PDUs are assigned the same priority ranking denoted as PDU Set Importance (PSI). Hence, when a PDU Set is defined as a video frame, it is not possible to assign different PSI values to different parts of a picture. A PDU Set can be defined as video slices; however, slices are not suitable for use in viewport-dependent streaming (VDS). Consequently, in a VDS scenario, it is currently not possible for a sender to indicate priority for the regions corresponding to the user's viewport, while streaming 360-degree video or volumetric video.

In a video stream, if a PDU Set is defined as a video frame/slice, the network would drop a whole frame/slice during congestion. However, depending on the congestion level, it might be sufficient to drop only the tiles corresponding to non-viewport/background regions or viewport margins (usually encoded at lower video quality, transmitted by the application but not displayed), while retaining the tiles carrying the user's viewport.

If such a spatial prioritization mechanism existed, the discarded PDU Sets (tiles) would have little to no impact on the user experience, since the discarded PDU Sets would likely belong to the background, i.e., to the areas that would be anyway not visible to the user at that time point. Also, the bit rate savings could be significant, and congestion could be considerably reduced in the network.

An overview is now provided, which addresses these and other problems. An example herein proposes that PDU Sets are defined as tiles (or subpictures) or tile sets (group of tiles) as in the example of 360-degree/omnidirectional video streaming. However, as the usage of tiles is not limited to 360-degree video streaming, examples herein also apply to streaming of other kinds of immersive media, such as volumetric video.

One example provides a dynamic spatial adaptation of the PSI based on user's viewport and/or other content-related metadata. Depending on the selected criteria (e.g., user's actual viewport), the sender (AS, UE or MRF, in 3GPP context) may dynamically set the PSI for each tile/tile set, meaning that the PDU Sets are dynamically assigned different PSIs at different time points.

The sender may determine the PSI for the PDU Sets belonging to a region based on a likelihood of that region corresponding to the user's viewport. For example, if a tile or tile set is falling (or more likely to fall) outside the user's viewport, the tile or tile set is given lower importance (higher PSI) for that time point. Hence, the tile or tile set is more likely to be dropped in case of congestion. Later, if the tile or tile set falls (or becomes more likely to fall) into the user's viewport, the tile or tile set is given a higher importance (lower PSI).

FIG. 11 illustrates left and right figures showing a video frame transmitted at a certain time point, but with different PSI values used. Both the left FIG. 1110 and right FIG. 1120 show a video frame transmitted at a certain time point. In the left FIG. 1110, a single PSI value of ten is used for the whole picture. In the right FIG. 1120, the picture is divided into tiles/tile sets and different PSI values are assigned to different tiles/tile sets. Tile sets are a group of tiles that are treated the same way. Specifically, the tile(s) 1140 corresponding to the viewport are assigned higher importance (lower PSI of 3) than the background tiles 1130-1 through 1130-8, which have PSI of 15.

It is noted that subpictures are also mentioned because they are a different construct than tiles and can be used, if e.g., VVC is used. So, generally herein, "tiles or subpictures" may be used. For the examples herein, the term tiles is often used, but without loss of generality.

Figure 12:
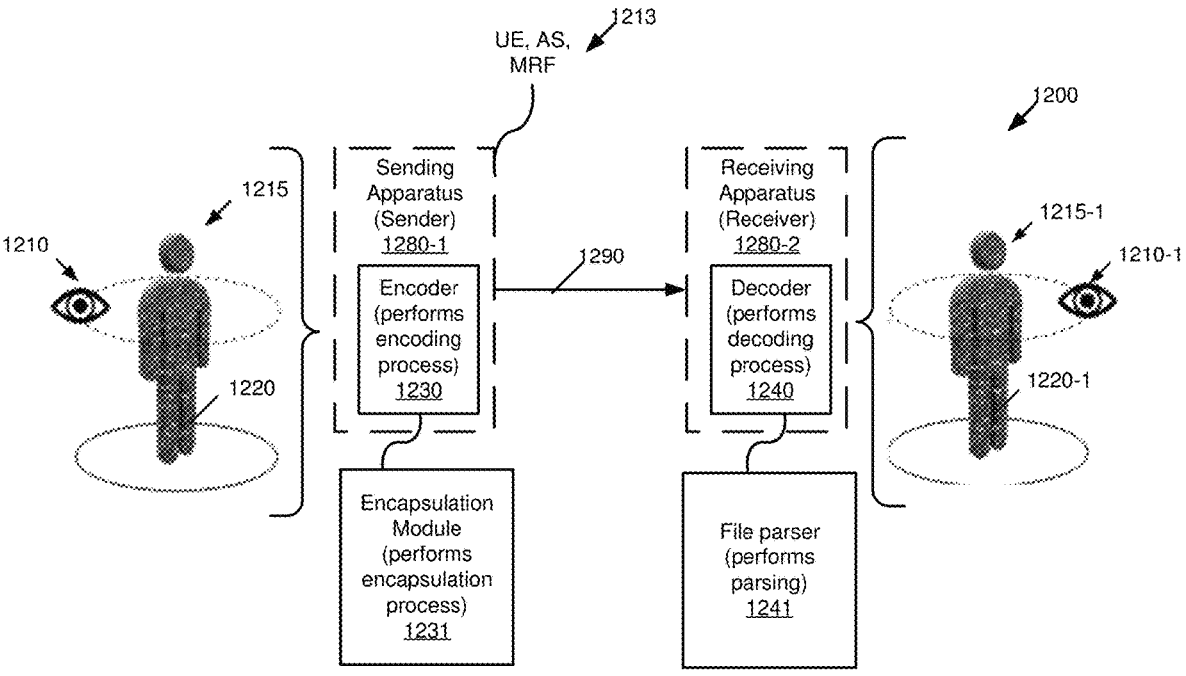
FIG. 12 is a block diagram illustrating a system in accordance with an example.

Turning to FIG. 12, FIG. 12 is a block diagram illustrating a system 1200 in accordance with an example. In the example, the encoder 1230 is used to encode video from the scene 1215, and the encoder 1230 is implemented in a sending apparatus 1280-1, which may also be referred to as a sender. The sending apparatus 1280-1 may be a UE 10, an AS, or an MRF, as examples. See reference 1213. The encoder 1230 produces a bitstream 1290 that is received by the receiving apparatus 1280-2, which may also be referred to as a receiver implements a decoder 1240. The encoder 1230 uses the techniques presented below and may perform an encapsulation process as by the encapsulation module 1231, or any other elements described herein to encapsulate data, and which forms part of the bitstream 1290 signaled by the encoder 1230. The decoder 1240 forms the video for the scene 1215-1, and the receiving apparatus 1280-2 would present this to the user, e.g., via a smartphone, television, or projector among many other options. The decoder 1240 may use a file parser 1241, which performs parsing to perform, e.g., a parsing process to enable the encapsulation to be reversed and provide data that can then be presented. In this example, there is a capture of 3D media from the volumetric capture at a viewpoint 1210 of a scene 1215, which includes a human being 1220. The receiving apparatus 1280-2 reproduces a version of the 3D media at a viewpoint 1210-1 of a scene 1215-1, which includes a human being 1220-1.

Figure 13:
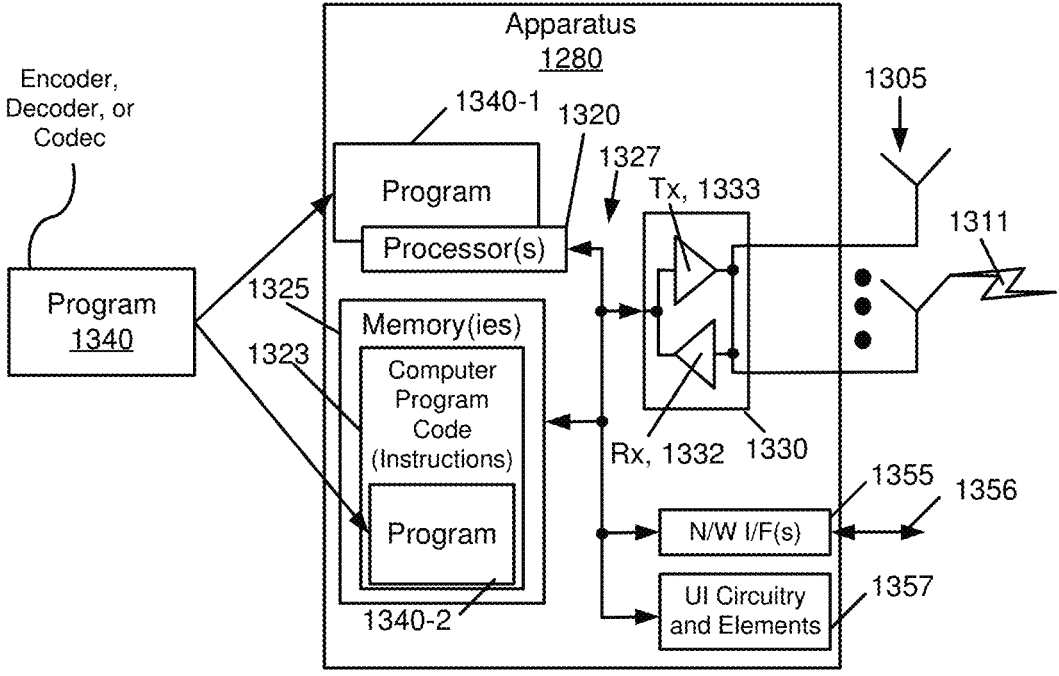
FIG. 13 is an example of a block diagram of an apparatus suitable for implementing any of the encoders or decoders described herein.

Referring to FIG. 13, this figure is an example of a block diagram of an apparatus suitable for implementing any of the encoders or decoders described herein. The apparatus 1280 includes circuitry comprising one or more processors 1320, one or more memories 1325, one or more transceivers 1330, one or more network (N/W) interface(s) (I/F(s)) 1355 and user interface (UI) circuitry and elements 1357, interconnected through one or more buses 1327. Depending on implementation, some apparatus may not have all of the circuitry. For example, an apparatus 1280 might not have UI circuitry and elements 1357. An apparatus may have additional circuitry, not described here. FIG. 13 is presented merely as an example.

Each of the one or more transceivers 1330 includes a receiver, Rx, 1332 and a transmitter, Tx, 1333. The one or more buses 1327 may be address, data, and/or control buses, and may include any interconnection mechanism, such as a series of lines on a motherboard or integrated circuit, fiber optics or other optical communication equipment, and the like. The one or more transceivers 1330 are connected to one or more antennas 1305, and may communicate using wireless link 1311.

The one or more memories 1325 include computer program code 1323. The apparatus 1280 includes a program 1340, comprising one of or both parts 1340-1 and/or 1340-2. The program 1340 may implement an encoder, a decoder, or a codec, which implements both encoding and decoding. The program itself may be implemented in a number of ways. The program 1340 may be implemented in hardware as program 1340-1, such as being implemented as part of the one or more processors 1320. The program 1340-1 may be implemented also as an integrated circuit or through other hardware such as a programmable gate array. In another example, the program 1340 may be implemented as program 1340-2, which is implemented as computer program code (having corresponding instructions) 1323 and is executed by the one or more processors 1320. For instance, the one or more memories 1325 store instructions that, when executed by the one or more processors 1320, cause the apparatus 1280 to perform one or more of the operations as described herein. Furthermore, the one or more processors 1320, one or more memories 1325, and example algorithms (e.g., as flowcharts and/or signaling diagrams), encoded as instructions, programs, or code, are means for causing performance of the operations described herein.

The network interface(s) (N/W I/F(s)) 1355 are wired interfaces communicating using link(s) 1356, which could be fiber optic or other wired interfaces. The apparatus 1280 could include only wireless transceiver(s) 1330, only N/W I/Fs 1355, or both wireless transceiver(s) 1330 and N/W I/Fs 1355.

The apparatus 1280 may or may not include UI circuitry and elements 1357. These could include a display such as a touchscreen, speakers, or interface elements such as for headsets. For instance, an apparatus 1280 of a smartphone would typically include at least a touchscreen and speakers. The UI circuitry and elements 1357 may also include circuitry to communicate with external UI elements (not shown) such as displays, keyboards, mice, headsets, and the like.

The computer readable memories 1325 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 1325 may be means for performing storage functions. The processors 1320 may be of any type suitable to the local technical environment, and may include one or more of general-purpose computers, special purpose computers, microprocessors, digital signal processors (DSPs) and processors based on a multi-core processor architecture, as non-limiting examples. The processors 1320 may be means for performing functions, such as controlling the apparatus 1280, and other functions as described herein.

Now that an overview has been provided, more details are provided. Some of these details are provided in reference to FIG. 14, which is split over FIGS. 14A and 14B, and which is a logic flow diagram for setting PDU set importance for immersive media streams, which include 360-degree video and volumetric video streams. It is noted that the following text uses both terms "importance" and "PSI" for the sake of convenience. As defined in 3GPP TS 26.522, PSI is a numerical value ranging between 0-15 (inclusive). It should be understood that lower PSI values correspond to a higher importance assigned to that PDU Set, and correspondingly higher PSI values correspond to a lower importance assigned to that PDU Set.

FIG. 14 illustrates a general set of operations, and many additional examples are presented below. The blocks in FIG. 14 are performed by a sender 1280-1. In block 1405, this involves defining, at a sender of a bitstream of coded 360-degree video, PDU Sets of the coded video comprising at least one spatial region of a frame of the coded 360-degree video. In block 1410, the sender 1280-1 assigns PDU Set Importances to the PDU sets, wherein the assignment is based on a spatial location of the at least one spatial region comprised in the PDU set and adaptation criteria. The spatial location of the at least one spatial region could be, e.g., a position of a tile within a frame. It is expected that individual PDU Set Importances are assigned to individual ones of the PDU Sets, but it might be possible for a PDU Set Importance to be assigned based on multiple PDU Sets. Adaptation criteria can include a user's viewport or eye gaze, spatial quality profile of the picture, and the like. The adaptation criteria may be a preference of the sending application, i.e., what data/criteria/factors the logic implemented in the application uses to adapt the PSI. In block 1413, the sender adapts over time the PDU set importances of the spatial location based on the adaptation criteria. In block 1415, the sender 1280-1 sends the bitstream comprising the coded 360-degree video. In this and other figures, blocks that depend from another block are sub-blocks. For instance, blocks 1406 and 1407 are sub-blocks of block 1405, and indicate how block 1405 might be performed as examples.

The blocks 1417 to 1440 can be sub-blocks of one or both of blocks 1410 or 1430. In more detail, except for blocks 1417 and 1427, the others in blocks 1417-1440 relate to the criteria that may be used to determine PSI. For instance, block 1417 describes the operation in case an MRF is present and applies a transcoding from viewport-independent to viewport-dependent; block 1427 describes how importance may be set if video overlays are used. In terms of relationships, all of blocks 1417-1440 (except blocks 1417 and 1427) relate to block 1413, since these are criteria that may be used to adapt the PSI and block 1413 is the block that describes adaptation. Blocks 1417 and 1427 relate at least to block 1410.

Concerning 360-degree/Omnidirectional video, consider the following. The sender 1280-1 can be an endpoint (AS or UE), or an MRF on the path that has received a viewport-independent stream with a fixed PSI value for the whole frame. If the sender 1280-1 is an MRF, the MRF can start to set the PSI dynamically for different tiles or subpictures after re-encoding viewport-independent 360-degree video into a viewport-dependent video based on the receiver's 1280-2 viewport or pose. See block 1417.

In an embodiment, each tile of a 360-degree video is defined as a PDU Set. See block 1406. This allows a more precise control of PSI in different picture regions depending on the tile size (e.g., in pixels). If a picture is divided into a larger number of tiles with smaller sizes, a more fine-granular assignment of PSI is possible.

Figures 15, 15A, 15B:
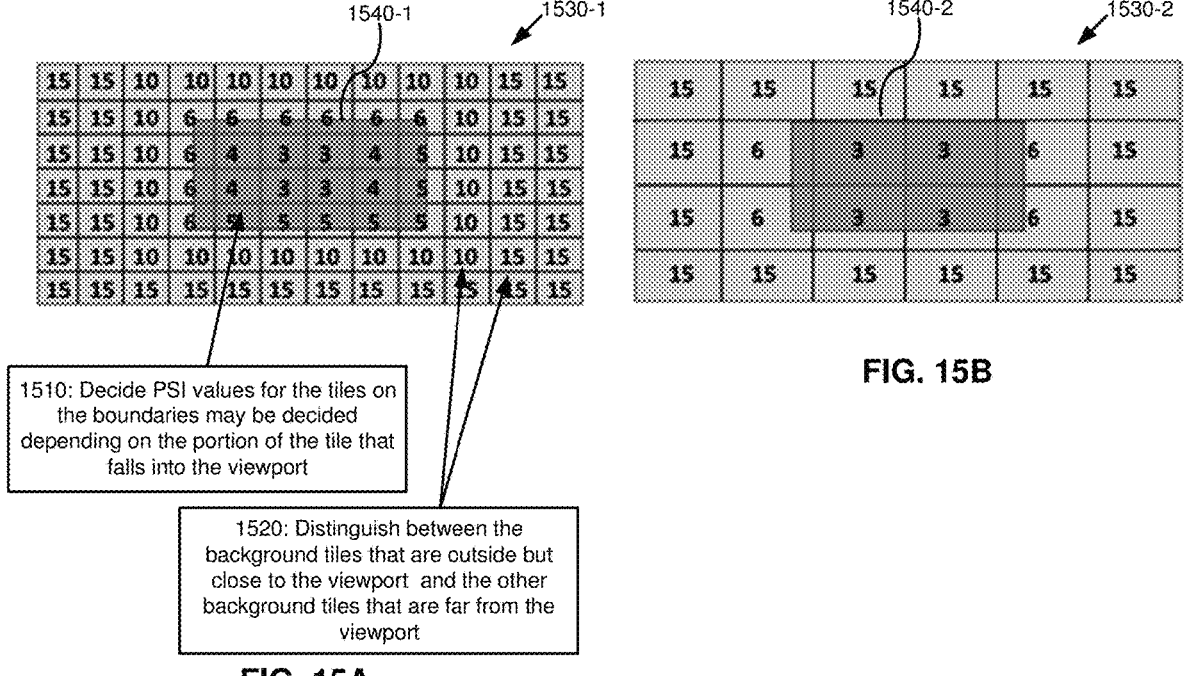
FIG. 15 is split between FIGS. 15A and 15B and illustrates an example where the picture in FIG. 15A is divided into 12×6 tiles and the picture in FIG. 15B into 8×4 tiles.

Turning briefly to FIG. 15, figure FIG. 15 is split between FIGS. 15A and 15B and shows an example where the picture in FIG. 15A is divided into 12×6 tiles and the picture in FIG. 15B into 8×4 tiles. Reference 1540-1 for FIG. 15A and 1540-2 for FIG. 15B shows the current viewport region and reference 1530-1 for FIG. 15A and 1530-2 for FIG. 15B shows the background regions. PSI values assigned to each tile are inserted into individual tiles. When the picture is split into a greater number of tiles (see FIG. 15A), the sender

1280-1 may set the viewport center (e.g., reference 1540) with higher importance and gradually reduce the importance as the distance increases from the viewport center. PSI values for the tiles on the boundaries may be decided depending on the portion of the tile that falls into the viewport. See block 1510. In the example on FIG. 15A, the sender assigns PSI=5, if more than 50% of the tile is in the viewport and PSI-6, if less than 50% of the tile is in the viewport. Also, the sender may distinguish between the background tiles that are outside but close to the viewport (set to PSI=10) and the other background tiles that are far from the viewport (set to PSI=15). See block 1520. With a smaller number of tiles, e.g., 8×4 as in the example on FIG. 15B, such a fine-granular PSI assignment may not be advantageous.

In another embodiment, and returning to FIG. 14, a PDU Set is defined to comprise a group of tiles (tile sets) of a 360-degree video. See block 1407 of FIG. 14. The number of tiles in a PDU Set can be determined by the application based on different factors. For example, if the scene contains many fine visual details, it would be desirable to define a PDU Set as only a single tile or few tiles (where a tile set has the few tiles). In this way, a more fine-granular discarding mechanism can be achieved in the network (e.g., network 1). The network may choose to discard smaller regions during congestion, which might be sufficient to mitigate congestion. On the other hand, if a PDU Set comprises several tiles, the network will have to discard larger spatial regions during congestion since PDU Sets are discarded as a whole when PDU Set integrated handling is used. If tile sizes are unequal, the sender may assign higher importance to larger tiles (covering bigger surface area in the rendered image) relative to smaller tiles. This would ensure that the larger tiles are more likely to be preserved during congestion and limit the artefacts affecting the rendered image.

For edge-assisted viewport-dependent delivery, the PSI of each tile may be rewritten by an edge node that has received an updated pose/viewport.

In an embodiment, the sender assigns the importance values to the PDU Sets in the following order: Viewport>Viewport margins>Background. See block 1420. For each of these three regions, importance may also be gradually reduced towards the boundaries. For example, the viewport center may be assigned the highest importance, while the viewport boundaries are assigned the lowest. Similarly, parts of the viewport margin closest to the viewport may be assigned higher importance than the parts which are closer to the background region.

In an embodiment, the sender may use a direction of a predicted head motion to adapt the importance values (e.g., the PDU Set Importance). See block 1423. For example, if the user's viewport is shifting towards right, the PDU Sets near the left boundary of the viewport are assigned lower importance, since they are less likely to be visible in the viewport in immediate future.

In another embodiment, the sender may use the user's head rotation velocity or acceleration to adapt the PSI. See block 1425. For example, if the user's head is moving at a fast rate, the PDU Sets currently inside the viewport are less likely to continue being inside the viewport in the immediate future. Therefore, they may be assigned a lower importance compared with the case where the user's head is moving at a slow rate. The rates are meant to be relative. That is, if the user's head movement speed is 10, PDU sets in viewport should be given less importance compared to the case where the speed is five.

In an embodiment, see block 1427, 360-degree video contains overlays (e.g., image/video streams rendered on the 360-sphere). Depending on the overlay content, the sender may assign a higher/lower importance value to the PDU Sets (frame/slice for 360-degree video) of the overlay stream compared with the importance values assigned to the viewport tiles, e.g., an overlay containing a screen share with slides may be assigned higher importance, whereas overlays containing 2D video streams from other conference rooms may be assigned lower importance.

In an embodiment, if a visual saliency (which could include attention) map is available, PSI for the different tiles may be set based on that map. See block 1430. Such a map may be obtained for example by analysis of the eye gaze data or scene analysis (e.g., optical flow information between the frames). In an embodiment, the visual attention/saliency map is calculated from the spatial quality profile of a frame. See block 1432.

In an embodiment, see block 1435, the PSI for different tiles or subpictures may be based on distance from a gaze point. The gaze point may be based on one or more of the following:

1) Tracked and reported by the viewing device, for example, a gaze tracker of an HMD; and/or 2) Estimated or predicted by the sender or a network entity, for example, based on one or more of the following: previously reported gaze data by a viewing device, viewing patterns, historical gaze data, visual content of the video, or the like.

In an embodiment, see block 1440, the number, size or PSI values of tiles or subpictures in a frame is based on one or more of:

1) Scene information, for example, from a scene description or from a rendering engine;

2) Reported or predicted gaze for the frame;

3) QoS policy;

4) Human visual system (HVS); and/or

5) Display and optical characteristics of the viewing device.

With respect to the HVS, when viewing video or any visual stimulus, the human visual system (HVS) assigns different priority to different spatial regions of the visual stimulus. For example, humans tend to focus on the central area of a picture more than its periphery. When humans do focus on a point in a picture or video frame, their eyes don't sample the whole frame equally (referred to as Foveation). Similarly, when viewing 360-degree video in a VR headset, our viewing patterns change and we look more at the center and the "horizon" of the current viewport. Interestingly in an HMD, we may also rotate our heads rather than move our eyes to follow a particular stimulus. All these effects and biases can be exploited to intelligently divide a frame into tiles/subpictures of different importance hence PSI values.

Block 1450 indicates that the selected criteria is at least one of a user's actual viewport, predicted viewport, a user's actual eye gaze, predicted eye gaze, and other content-related metadata.

FIGS. 16A and 16B show examples of HVS-based PSI assignment, assuming, for illustration, that the user's eye gaze is at the frame center. FIG. 16A shows the case where the application expects a "high" QOS while FIG. 16B shows when an application expects a "lower" QoS from the network.

FIGS. 17A and 17B show example non-uniform tiling (e.g., unequal sized tiles) and PSI assignment based on HVS as well as display and optical characteristics of a typical HMD assuming, for illustration, that the user's eye gaze is at the frame center. FIG. 17A is a case where the application expects high QoS from the network and FIG. 17B is a case where the application expects lower QoS from the network.

This may be combined with head rotation velocity and/or optical flow information of the frames. A sender may use multiple methods together when assigning PSI. For example, a sender may assign the importance in the order viewport>viewport margin>background, while further assigning a range of importance within the viewport based on a visual attention map or tile size.

Examples of the above applied to volumetric video are now described. Consider FIG. 18, which is split over FIGS. 18A and 18B, and which is a logic flow diagram for setting PDU Set Importance for volumetric video. FIG. 18 is a version of FIG. 14 but tailored to volumetric video. In block 1805, a sender 1280-1 defines, for a bitstream of coded video formed from volumetric video, PDU Sets comprising at least one spatial region of a frame of the coded video. By the phrase spatial region, what is meant is a 3D portion of an object or scene. Depending on the 3D representation, this region could be a collection of tiles or subpictures of multiple video streams containing texture, geometry data, and the like. A region could be in some other form like collection of points, if data is kept in point cloud form.

In block 1810, the sender 1280-1 performs spatial adaptation of PDU Set Importance based on adaptation criteria, the spatial adaptation signaled in the coded video of the bitstream, wherein the PDU Sets are assigned via the spatial adaptation different PDU Set Importance values at different time points. In block 1815, the sender 1280-1 sends, toward a receiver, the bitstream comprising the coded video. Additional examples are now described.

In an embodiment, each 3D region in a scene can be considered as a PDU Set. See block 1807. In that case, the sender may adapt the PSI based on the user's pose, current viewport, or both. See block 1809. Note that block 1809 may be a precursor to block 1810 or an example of how block 1810 could be performed (and based on block 1807 being performed). Also, consider the following. In block 1807, each 3D region is considered a PDU Set. So, each region has a PSI. Block 1809 adapts the PSI of each such region based on the user state (pose, viewport). Example: If the user is approaching a specific 3D region, this region will cover a larger portion of the user's viewport, so it might make sense to assign higher importance.

For example, see block 1811, if the user is approaching an object, that object will cover a larger portion of the user's viewport. The sender may assign higher importance to the PDU Sets corresponding to that object. If the user gets too close to the object, the user's whole viewport may be filled by only some parts of the object, and the remaining parts fall out of the viewport. In that case, the sender may assign higher importance to the parts of the object inside the viewport.

In case multiple objects are present in the scene, the user's pose also determines which objects are occluded/disoccluded. If some parts of an object are being occluded (or disoccluded) due to user's motion, the sender may assign lower (e.g., higher) importance to the PDU Sets (e.g., tiles) covering those regions. See block 1813. For clarity, lower importance is assigned to PDU Sets (e.g., tiles) covering occluded regions, and higher importance is assigned to PDU sets (e.g., tiles) covering disoccluded regions.

If there exists one or more moving objects in the scene, some object regions may appear smaller/larger to the user or become occluded/disoccluded, even if the user is static. In this case, the sender may adapt PSI by jointly considering the movements of the object and the user's pose. See block 1814.

If V3C is used, tiles/subpictures may be used within a video component (e.g., geometry, texture, or the like) for patches associated with a particular view ID. Based on the pose of the user, some view IDs may be less important than others, and consequently the subpictures associated with them can be assigned a higher PSI value (lower importance). See block 1817.

Note that if the V3C video components are multiplexed, the PSI values may be assigned such that a set of lower PSI values (high importance) is assigned to a high-priority video component (e.g., geometry) and a set of higher PSI (low importance) values is assigned to a low-priority video component (e.g., texture). See block 1821. Geometry can be considered to have a higher priority than texture because geometry is more critical for the reconstruction of the 3D object or scene. There may be other video components too though, and what is more important may depend on the application or content as well. For instance, there might be other attribute components in addition to texture, then it might not be so straightforward to assign such priority. But for geometry and texture, it is clearer.

The sender 1280-1 could then implement a discard scheme based on the assigned importance values. The discard scheme may then work to i) discard PDU Sets having low-priority subpictures from the texture bitstream, then ii) discard high-priority subpictures from the texture bitstream, then iii) discard low-priority subpictures from geometry bitstreams, and so on. In another scheme, the importance values are assigned such that, first i) discard low-priority subpictures from the texture bitstream, then ii) discard low-priority subpictures from the geometry bitstream, then iii) discard high-priority subpictures from the texture bitstream. See block 1824.

These can be characterized by block 1825, where performing spatial adaptation of importance comprises assigning an importance value in increasing order of importance to low-priority subpictures of a low priority component bitstream of volumetric media, then high-priority subpictures of a low priority component bitstream, then low-priority subpictures from a high priority bitstream and then high priority subpictures from a high priority bitstream; wherein the priority of subpictures are based on the selected criteria and spatial adaptation. While this example uses low and high, this is simplistic and could be expanded so that there can be more than two component bitstreams so it may be low, than higher, and then even higher and so on. Consider the following: spatial adaptation of importance comprises assigning an importance value in increasing order of importance to first-priority subpictures of a first priority component bitstream of volumetric media, then second-priority subpictures of a first priority component bitstream, then first-priority subpictures from a second priority bitstream and then second priority subpictures from a second priority bitstream; wherein the priority of subpictures are based on the adaptation criteria and spatial adaptation.

See also block 1827, where performing spatial adaptation of importance comprises assigning an importance value in increasing order of importance to low-priority subpictures of a low priority component bitstream of volumetric media, then low-priority subpictures of a high priority component bitstream, then high-priority subpictures from a low priority bitstream and then high priority subpictures from a high priority bitstream; wherein the priority of subpictures are based on the selected criteria and spatial adaptation.

Different video components of MIV can be encoded as subpictures as well. The PSI values can then be assigned such that video components (e.g., atlases) with low priority (e.g., texture) are assigned a higher PSI than those with high priority (e.g., geometry). See block 1830.

Figure 19:
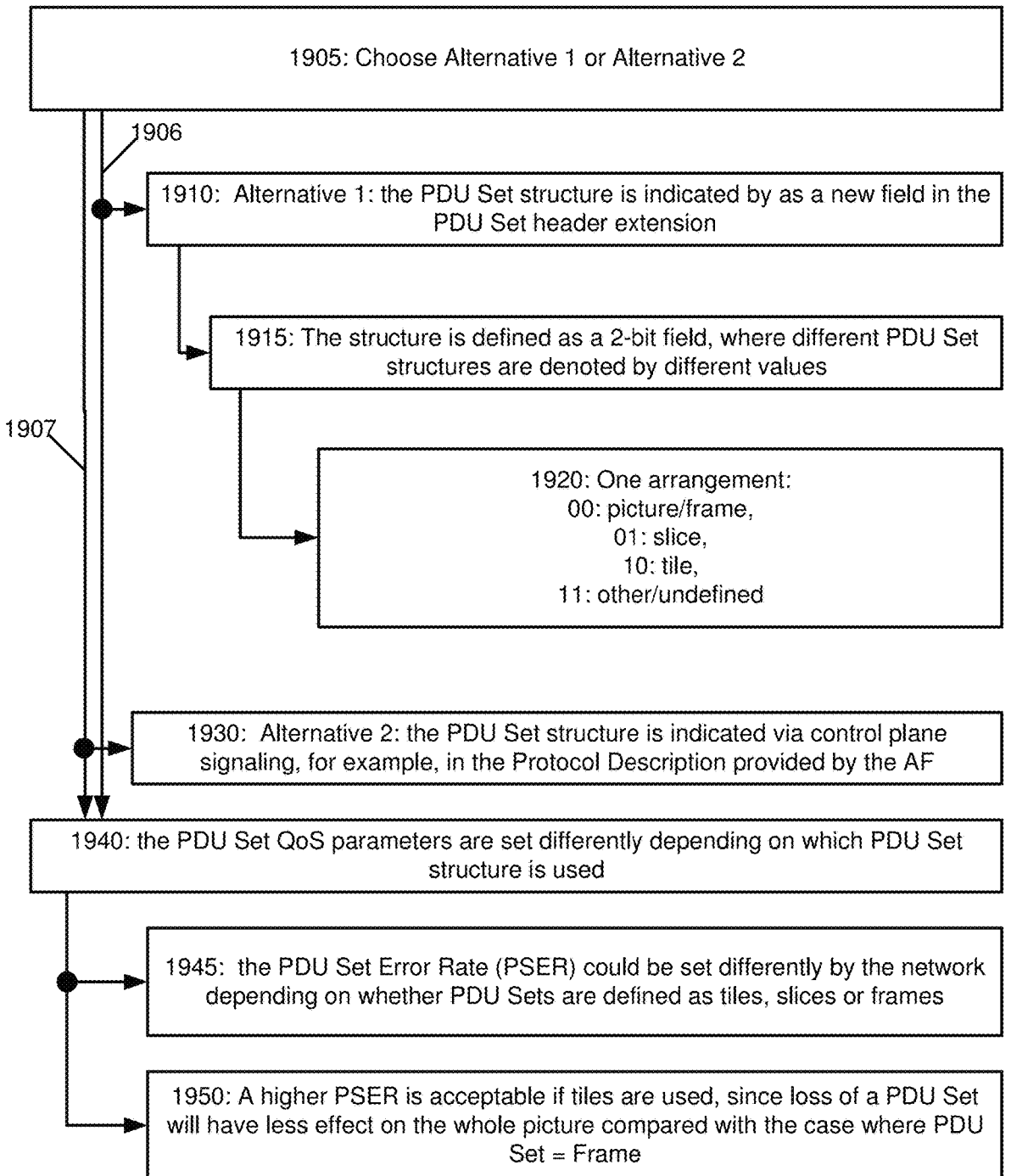
FIG. 19 is a logic flow diagram describing two different alternative signaling solutions.

Now that examples with volumetric video have been described, attention turns to alternative signaling solutions. Specifically, two examples of alternatives are described. These alternatives could apply to both 360-degree and volumetric video. Reference is made to FIG. 19, which is a logic flow diagram describing two different alternative signaling solutions.

A sender 1280-1 would typically choose an alternative to be used, and any receiver 1280-2 would be alerted to the choice. In block 1905, the sender chooses to use Alternative 1 or Alternative 2. If Alternative 1 is chosen, path 1906 is followed to block 1910, whereas if Alternative 2 is chosen, path 1907 is followed to block 1930.

Alternative 1 is first described. In one technique, the PDU Set structure can be indicated by an encoder in the sender as a new field in the PDU Set RTP header extension. See block 1910. PDU Set structure refers to the coded data construct encapsulated in the PDU Set, e.g., a slice or a subpicture. The structure can be defined as a 2-bit field, where different PDU Set structures are denoted by different values. See block 1915.

For example, one arrangement could look like the following (see block 1920):

00: picture/frame,
    01: slice,
    10: tile,
    11: other/undefined.

This is one example, and other examples are possible.

Alternative 2 is now described. In another technique, the PDU Set structure can be indicated via control plane signaling, for example, in the Protocol Description provided by the AF. See block 1930. Currently, Protocol Description includes transport protocol, transport protocol header extensions, payload type and format, and format parameters (e.g., H.264 profile level and packetization mode) used by the service data flow.

Such signaling may be useful because the PDU Set QoS parameters may need to be set differently depending on which PDU Set structure is used. See block 1940. Block 1940 can depend from either 1906 or 1907. As an example of block 1940, the PDU Set Error Rate (PSER) could be set differently by the network depending on whether PDU Sets are defined as tiles, slices or frames. See block 1945. The network in this example could be a 5G network. Having received the information on PDU Set structure, the 5G network can configure the QoS parameters like PSER.

A higher PSER may be acceptable if tiles are used, since loss of a PDU Set will have less effect on the whole picture compared with the case where PDU Set=Frame. See block 1950.

Turning to FIG. 20, this figure is a logic flow diagram of an example of decoding performed by a receiver and corresponds to the encoding of FIG. 14 (and FIG. 19). In block 2010, a receiver receives, from a sender, a bitstream of coded 360-degree video wherein PDU Sets of individual pictures of the coded 360-degree video are defined as spatial regions, the bitstream formed using spatial adaptation of PDU Set Importance for the spatial regions in a picture of video from the 360-degree video based on adaptation criteria. The receiving includes receiving the spatial adaptation signaled in the coded 360-degree video of the bitstream, wherein the PDU Sets are assigned different importance at different time points. Block 2020 comprises parsing, by the receiver, information from the coded video based at least on the spatial adaptation of PDU Set Importance for multiple tiles or subpictures in the picture of video from the coded 360-degree video based on the adaptation criteria. Block 2030 includes outputting, by the receiver, at least part of a decoded 360-degree video based on the parsed information. Block 2040 indicates that any of the blocks 1406, 1407, and 1417-1450 in FIG. 14 or any block in FIG. 19 can be adapted for decoding.

FIG. 21 is a logic flow diagram of an example of decoding performed by a receiver and corresponds to the encoding of FIG. 18 (and FIG. 19). In block 2110, a receiver receives, from a sender, a bitstream of coded volumetric video wherein PDU Sets of individual pictures of the coded video are defined as one or multiple regions. The bitstream is formed using spatial adaptation of PDU Set Importance for multiple regions in a picture of the volumetric video based on adaptation criteria. The receiving includes receiving the spatial adaptation signaled in the coded video of the bitstream, wherein the PDU Sets are assigned different importance at different time points. Block 2120 includes parsing, by the receiver, information from the coded video based at least on the spatial adaptation of PDU Set Importance for the regions in the picture of the volumetric video based on the adaptation criteria. Block 2130 comprises outputting at least part of a decoded volumetric video based on the parsed information. Block 2140 indicates that any of the blocks 1807, 1809, and 1811-1830 in FIG. 18 or any block in FIG. 19 can be adapted for decoding.

Without in any way limiting the scope, interpretation, or application of the claims appearing below, a technical effect and/or advantage of one or more of the example embodiments disclosed herein is the examples can provide a better user experience during congestion by enabling the network to discard only the less important regions instead of a full picture. Another technical effect and/or advantage of one or more of the example embodiments disclosed herein is that the network can perform a more effective congestion management.

The following are additional examples.

Example 1. A method, comprising: defining, at a sender of a bitstream of coded 360-degree video, protocol data unit sets of the coded 360-degree video, the protocol data unit sets comprising at least one spatial region of a frame of the coded 360-degree video; assigning, by the sender, protocol data unit set importances to the protocol data unit sets, wherein the assignment is based on a spatial location of the at least one spatial region comprised in the protocol data unit set and adaptation criteria; adapting, by the sender, over time the protocol data unit set importance values of the protocol data unit sets corresponding to the spatial location based on the adaptation criteria; and sending, by the sender toward a receiver, the bitstream comprising the coded 360-degree video.

Example 2. The method according to example 1, wherein the spatial region comprises one or more tiles or one or more subpictures of the frame of the coded 360-degree video.

Example 3. The method according to example 1, wherein the spatial region comprises a group of tiles of the coded 360-degree video or a group of subpictures of the coded 360-degree video.

Example 4. The method according to any one of examples 1 to 3, performed at a media resource function on a path that has received a viewport-independent stream with a fixed protocol data unit set importance value for a whole frame of video, wherein the at least one spatial region comprise tiles or subpictures, and wherein performing spatial adaptation of protocol data unit set importance comprises setting a protocol data unit set importance dynamically for different tiles or subpictures of the coded 360-degree video after re-encoding a viewport-independent 360-degree video into a viewport-dependent video based on a receiver's viewport or pose.

Example 5. The method according to any one of examples 1 to 4, wherein performing spatial adaptation of protocol data unit set importance comprises assigning importance values to protocol data unit sets in a following order: viewport is more important than viewport margins, which is more important than background.

Example 6. The method according to any one of examples 1 to 5, wherein performing spatial adaptation of protocol data unit set importance comprises using a direction of a predicted head motion to adapt the protocol data unit set importance for the at least one spatial region in a picture.

Example 7. The method according to any one of examples 1 to 6, wherein performing spatial adaptation of protocol data unit set importance comprises using a user's head rotation velocity or acceleration to adapt the protocol data unit set importance for multiple tiles or subpictures in a picture.

Example 8. The method according to any one of examples 1 to 7, wherein the coded 360-degree video contains overlays and the performing spatial adaptation of protocol data unit set importance comprises depending on overlay content in the overlays, assigning a higher/lower importance value to protocol data unit sets of an overlay stream comprising the overlays compared with importance values assigned to a viewport tile.

Example 9. The method according to any one of examples 1 to 8, wherein performing spatial adaptation of protocol data unit set importance comprises based on a visual saliency map being available, setting the protocol data unit set importance for different tiles are based on that map.

Example 10. The method according to example 9, wherein the visual saliency map is calculated from spatial quality profile of a frame of video in the coded 360-degree video.

Example 11. The method according to any one of examples 1 to 8, wherein performing spatial adaptation of protocol data unit set importance comprises basing the protocol data unit set importance for different tiles or subpictures on distance from a gaze point, wherein the gaze point is one or both of the following: tracked and reported by a viewing device; or estimated or predicted by a sender or a network entity, based on one or more of the following: previously reported gaze data by a viewing device, viewing patterns, historical gaze data, visual content of the video.

Example 12. The method according to any one of examples 1 to 8, wherein performing spatial adaptation of protocol data unit set importance comprises basing a number, a size, or values for protocol data unit set importance of tiles or subpictures in a frame on one or more of the following: scene information, from a scene description or from a rendering engine; reported or predicted gaze for the frame; quality of service policy; human visual system (HVS); or display and optical characteristics of a viewing device used to view the coded 360-degree video.

Example 13. The method according to any of examples 1 to 12, wherein the adaptation criteria is at least one of a user's actual viewport, predicted viewport, a user's actual eye gaze, predicted eye gaze, and other content-related metadata.

Example 14. The method according to any of examples 1 to 13, wherein the sender comprises one of an application server, a user equipment or a media resource function.

Example 15. The method according to any of examples 1 to 14, wherein the sending is performed by indicating a protocol data unit set structure by a field in a protocol data unit set header extension.

Example 16. The method according to example 15, wherein the field is a 2-bit field, where different protocol data unit set structures are denoted by different values: a first set of two bits indicates picture/frame; a second set of the two bits indicates a slice; a third set of the two bits indicates a tile; and a fourth set of the two bits indicates one of other or undefined.

Example 17. The method according to any of examples 1 to 14, wherein the sending is performed by indicating a protocol data unit set structure via control plane signaling.

Example 18. The method according to any of examples 15 to 17, further comprising setting quality of service parameters for protocol data unit sets differently depending on which protocol data unit set structure is used.

Example 19. The method according to example 18, wherein a protocol data unit set error rate (PSER) is set differently by a network depending on whether protocol data unit sets are defined as tiles, slices or frames.

Example 20. The method according to example 18, wherein a higher protocol data unit set error rate is used if tiles are used, as compared to a case where protocol data unit sets are frames and lower protocol data unit set error rate is used.

Example 21. A method, comprising: receiving, at a receiver from a sender, a bitstream of coded 360-degree video wherein protocol data unit sets of individual pictures of the coded 360-degree video are defined as spatial regions, the bitstream formed using spatial adaptation of protocol data unit set importance for the spatial regions in a picture of video from the coded 360-degree video based on adaptation criteria, the receiving including receiving the spatial adaptation signaled in the coded video of the bitstream, wherein the protocol data unit sets are assigned different importance at different time points; parsing, by the receiver, information from the coded 360-degree video based at least on the spatial adaptation of protocol data unit set importance for multiple tiles or subpictures in the picture of video from the coded 360-degree video based on the adaptation criteria; and outputting, by the receiver, at least part of a decoded 360-degree video based on the parsed information.

Example 22. A computer program, comprising instructions for performing the methods of any of examples 1 to 21, when the computer program is run on an apparatus.

Example 23. The computer program according to example 22, wherein the computer program is a computer program product comprising a computer-readable medium bearing instructions embodied therein for use with the apparatus.

Example 24. The computer program according to example 22, wherein the computer program is directly loadable into an internal memory of the apparatus.

Example 25. An apparatus, comprising means for performing: defining, at a sender of a bitstream of coded 360-degree video, protocol data unit sets of the coded 360-degree video, the protocol data unit sets comprising at least one spatial region of a frame of the coded 360-degree video; assigning, by the sender, protocol data unit set importances to the protocol data unit sets, wherein the assignment is based on a spatial location of the at least one spatial region comprised in the protocol data unit set and adaptation criteria; adapting, by the sender, over time the protocol data unit set importance values of the protocol data unit sets corresponding to the spatial location based on the adaptation criteria; and sending, by the sender toward a receiver, the bitstream comprising the coded 360-degree video.

Example 26. The apparatus according to example 25, wherein the spatial region comprises one or more tiles or one or more subpictures of the frame of the coded 360-degree video.

Example 27. The apparatus according to example 25, wherein the spatial region comprises a group of tiles of the coded 360-degree video or a group of subpictures of the coded 360-degree video.

Example 28. The apparatus according to any one of examples 25 to 27, performed at a media resource function on a path that has received a viewport-independent stream with a fixed protocol data unit set importance value for a whole frame of video, wherein the at least one spatial region comprise tiles or subpictures, and wherein performing spatial adaptation of protocol data unit set importance comprises setting a protocol data unit set importance dynamically for different tiles or subpictures of the coded 360-degree video after re-encoding a viewport-independent 360-degree video into a viewport-dependent video based on a receiver's viewport or pose.

Example 29. The apparatus according to any one of examples 25 to 28, wherein performing spatial adaptation of protocol data unit set importance comprises assigning importance values to protocol data unit sets in a following order: viewport is more important than viewport margins, which is more important than background.

Example 30. The apparatus according to any one of examples 25 to 29, wherein performing spatial adaptation of protocol data unit set importance comprises using a direction of a predicted head motion to adapt the protocol data unit set importance for the at least one spatial region in a picture.

Example 31. The apparatus according to any one of examples 25 to 30, wherein performing spatial adaptation of protocol data unit set importance comprises using a user's head rotation velocity or acceleration to adapt the protocol data unit set importance for multiple tiles or subpictures in a picture.

Example 32. The apparatus according to any one of examples 25 to 31, wherein the coded 360-degree video contains overlays and the performing spatial adaptation of protocol data unit set importance comprises depending on overlay content in the overlays, assigning a higher/lower importance value to protocol data unit sets of an overlay stream comprising the overlays compared with importance values assigned to a viewport tile.

Example 33. The apparatus according to any one of examples 25 to 32, wherein performing spatial adaptation of protocol data unit set importance comprises based on a visual saliency map being available, setting the protocol data unit set importance for different tiles are based on that map.

Example 34. The apparatus according to example 32, wherein the visual saliency map is calculated from spatial quality profile of a frame of video in the coded 360-degree video.

Example 35. The apparatus according to any one of examples 25 to 32, wherein performing spatial adaptation of protocol data unit set importance comprises basing the protocol data unit set importance for different tiles or subpictures on distance from a gaze point, wherein the gaze point is one or both of the following: tracked and reported by a viewing device; or estimated or predicted by a sender or a network entity, based on one or more of the following: previously reported gaze data by a viewing device, viewing patterns, historical gaze data, visual content of the video.

Example 36. The apparatus according to any one of examples 25 to 32, wherein performing spatial adaptation of protocol data unit set importance comprises basing a number, a size, or values for protocol data unit set importance of tiles or subpictures in a frame on one or more of the following: scene information, from a scene description or from a rendering engine; reported or predicted gaze for the frame; quality of service policy; human visual system (HVS); or display and optical characteristics of a viewing device used to view the coded 360-degree video.

Example 37. The apparatus according to any of examples 25 to 36, wherein the adaptation criteria is at least one of a user's actual viewport, predicted viewport, a user's actual eye gaze, predicted eye gaze, and other content-related metadata.

Example 38. The apparatus according to any of examples 25 to 37, wherein the sender comprises one of an application server, a user equipment or a media resource function.

Example 39. The apparatus according to any of examples 25 to 38, wherein the sending is performed by indicating a protocol data unit set structure by a field in a protocol data unit set header extension.

Example 40. The apparatus according to example 39, wherein the field is a 2-bit field, where different protocol data unit set structures are denoted by different values: a first set of two bits indicates picture/frame; a second set of the two bits indicates a slice; a third set of the two bits indicates a tile; and a fourth set of the two bits indicates one of other or undefined.

Example 41. The apparatus according to any of examples 25 to 38, wherein the sending is performed by indicating a protocol data unit set structure via control plane signaling.

Example 42. The apparatus according to any of examples 39 to 41, wherein the means are further configured for performing: setting quality of service parameters for protocol data unit sets differently depending on which protocol data unit set structure is used.

Example 43. The apparatus according to example 42, wherein a protocol data unit set error rate (PSER) is set differently by a network depending on whether protocol data unit sets are defined as tiles, slices or frames.

Example 44. The apparatus according to example 42, wherein a higher protocol data unit set error rate is used if tiles are used, as compared to a case where protocol data unit sets are frames and lower protocol data unit set error rate is used.

Example 45. An apparatus, comprising: receiving, at a receiver from a sender, a bitstream of coded 360-degree video wherein protocol data unit sets of individual pictures of the coded 360-degree video are defined as spatial regions, the bitstream formed using spatial adaptation of protocol data unit set importance for the spatial regions in a picture of video from the coded 360-degree video based on adaptation criteria, the receiving including receiving the spatial adaptation signaled in the coded video of the bitstream, wherein the protocol data unit sets are assigned different importance at different time points; parsing, by the receiver, information from the coded 360-degree video based at least on the spatial adaptation of protocol data unit set importance for multiple tiles or subpictures in the picture of video from the coded 360-degree video based on the adaptation criteria; and outputting, by the receiver, at least part of a decoded 360-degree video based on the parsed information.

Example 46. The apparatus of any preceding apparatus example, wherein the means comprises: at least one processor; and at least one memory storing instructions that, when executed by at least one processor, cause the performance of the apparatus.

Example 47. An apparatus, comprising: one or more processors; and one or more memories storing instructions that, when executed by the one or more processors, cause the apparatus at least to perform: defining, at a sender of a bitstream of coded 360-degree video, protocol data unit sets of the coded 360-degree video, the protocol data unit sets comprising at least one spatial region of a frame of the coded 360-degree video; assigning, by the sender, protocol data unit set importances to the protocol data unit sets, wherein the assignment is based on a spatial location of the at least one spatial region comprised in the protocol data unit set and adaptation criteria; adapting, by the sender, over time the protocol data unit set importance values of the protocol data unit sets corresponding to the spatial location based on the adaptation criteria; and sending, by the sender toward a receiver, the bitstream comprising the coded 360-degree video.

Example 48. The apparatus according to example 47, wherein the spatial region comprises one or more tiles or one or more subpictures of the frame of the coded 360-degree video.

Example 49. The apparatus according to example 47, wherein the spatial region comprises a group of tiles of the coded 360-degree video or a group of subpictures of the coded 360-degree video.

Example 50. The apparatus according to any one of examples 47 to 49, performed at a media resource function on a path that has received a viewport-independent stream with a fixed protocol data unit set importance value for a whole frame of video, wherein the at least one spatial region comprise tiles or subpictures, and wherein performing spatial adaptation of protocol data unit set importance comprises setting a protocol data unit set importance dynamically for different tiles or subpictures of the coded 360-degree video after re-encoding a viewport-independent 360-degree video into a viewport-dependent video based on a receiver's viewport or pose.

Example 51. The apparatus according to any one of examples 47 to 50, wherein performing spatial adaptation of protocol data unit set importance comprises assigning importance values to protocol data unit sets in a following order: viewport is more important than viewport margins, which is more important than background.

Example 52. The apparatus according to any one of examples 47 to 51, wherein performing spatial adaptation of protocol data unit set importance comprises using a direction of a predicted head motion to adapt the protocol data unit set importance for the at least one spatial region in a picture.

Example 53. The apparatus according to any one of examples 47 to 52, wherein performing spatial adaptation of protocol data unit set importance comprises using a user's head rotation velocity or acceleration to adapt the protocol data unit set importance for multiple tiles or subpictures in a picture.

Example 54. The apparatus according to any one of examples 47 to 53, wherein the coded 360-degree video contains overlays and the performing spatial adaptation of protocol data unit set importance comprises depending on overlay content in the overlays, assigning a higher/lower importance value to protocol data unit sets of an overlay stream comprising the overlays compared with importance values assigned to a viewport tile.

Example 55. The apparatus according to any one of examples 47 to 54, wherein performing spatial adaptation of protocol data unit set importance comprises based on a visual saliency map being available, setting the protocol data unit set importance for different tiles are based on that map.

Example 56. The apparatus according to example 55, wherein the visual saliency map is calculated from spatial quality profile of a frame of video in the coded 360-degree video.

Example 57. The apparatus according to any one of examples 47 to 54, wherein performing spatial adaptation of protocol data unit set importance comprises basing the protocol data unit set importance for different tiles or sub-pictures on distance from a gaze point, wherein the gaze point is one or both of the following: tracked and reported by a viewing device; or estimated or predicted by a sender or a network entity, based on one or more of the following: previously reported gaze data by a viewing device, viewing patterns, historical gaze data, visual content of the video.

Example 58. The apparatus according to any one of examples 47 to 54, wherein performing spatial adaptation of protocol data unit set importance comprises basing a number, a size, or values for protocol data unit set importance of tiles or subpictures in a frame on one or more of the following: scene information, from a scene description or from a rendering engine; reported or predicted gaze for the frame; quality of service policy; human visual system (HVS); or display and optical characteristics of a viewing device used to view the coded 360-degree video.

Example 59. The apparatus according to any of examples 47 to 58, wherein the adaptation criteria is at least one of a user's actual viewport, predicted viewport, a user's actual eye gaze, predicted eye gaze, and other content-related metadata.

Example 60. The apparatus according to any of examples 47 to 59, wherein the sender comprises one of an application server, a user equipment or a media resource function.

Example 61. The apparatus according to any of examples 47 to 60, wherein the sending is performed by indicating a protocol data unit set structure by a field in a protocol data unit set header extension.

Example 62. The apparatus according to example 61, wherein the field is a 2-bit field, where different protocol data unit set structures are denoted by different values: a first set of two bits indicates picture/frame; a second set of the two bits indicates a slice; a third set of the two bits indicates a tile; and a fourth set of the two bits indicates one of other or undefined.

Example 63. The apparatus according to any of examples 47 to 60, wherein the sending is performed by indicating a protocol data unit set structure via control plane signaling.

Example 64. The apparatus according to any of examples 61 to 63, wherein the one or more memories further store instructions that, when executed by the one or more processors, cause the apparatus at least to perform: setting quality of service parameters for protocol data unit sets differently depending on which protocol data unit set structure is used.

Example 65. The apparatus according to example 64, wherein a protocol data unit set error rate (PSER) is set differently by a network depending on whether protocol data unit sets are defined as tiles, slices or frames.

Example 66. The apparatus according to example 64, wherein a higher protocol data unit set error rate is used if tiles are used, as compared to a case where protocol data unit sets are frames and lower protocol data unit set error rate is used.

Example 67. An apparatus, comprising: one or more processors; and one or more memories storing instructions that, when executed by the one or more processors, cause the apparatus at least to perform: receiving, at a receiver from a sender, a bitstream of coded 360-degree video wherein protocol data unit sets of individual pictures of the coded 360-degree video are defined as spatial regions, the bitstream formed using spatial adaptation of protocol data unit set importance for the spatial regions in a picture of video from the coded 360-degree video based on adaptation criteria, the receiving including receiving the spatial adaptation signaled in the coded video of the bitstream, wherein the protocol data unit sets are assigned different importance at different time points; parsing, by the receiver, information from the coded 360-degree video based at least on the spatial adaptation of protocol data unit set importance for multiple tiles or subpictures in the picture of video from the coded 360-degree video based on the adaptation criteria; and outputting, by the receiver, at least part of a decoded 360-degree video based on the parsed information.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 8. A computer-readable medium may comprise a computer-readable storage medium (e.g., memories 15, 75, and 95 or other device) that may be any media or means that can contain, store, and/or transport the instructions for use by or in connection with an instruction execution system, apparatus, or device, such as a computer. A computer-readable storage medium does not comprise propagating signals, and therefore may be considered to be non-transi-tory. The term "non-transitory", as used herein, is a limita-tion of the medium itself (i.e., tangible, not a signal) as opposed to a limitation on data storage persistency (e.g., RAM, random access memory, versus ROM, read-only memory).

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention com-prise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

2D two-dimensional
5G fifth generation
5G-AN fifth generation access network
5GC fifth generation core (network)
3DoF three degrees of freedom
6DoF six degrees of freedom
AF application function
AN access network
AR Augmented reality
AS application server
AVC Advanced video coding
CTU Coding tree unit
DASH Dynamic Adaptive Streaming over Hypertext Transfer Protocol (HTTP)
DL downlink (e.g., from network to UE)
DN data network
eNB (or eNodeB) evolved Node B (e.g., an LTE base station)
gNB (or gNodeB) base station for 5G/NR
ERP Equirectangular projection
E-UTRA Evolved Universal Terrestrial Radio Access
GPRS General Packet Radio Service
GTP GPRS Tunnelling Protocol
HEVC High Efficiency Video Coding
HMD Head-mounted display
HVS Human visual system
IANA Internet Assigned Numbers Authority
ID identifier
I/F interface
IMS IP Multimedia Subsystem
IP Internet protocol
LTE long term evolution
MIV MPEG immersive video
MPEG Motion picture experts group
MR Mixed reality
MRF media resource function
MTU maximum transmission unit
NAL Network abstraction layer
NF network function
NG new generation
NR new radio
N/W or NW network

38

PCC Policy and Charging Control
PCF policy control function
PDR Packet Detection Rule
PDU protocol data unit
PSDB PDU Set Delay Budget
PSER PDU Set error rate
PSI PDU Set Importance
PSIHI PDU Set Integrated Handling Information
PSN PDU Sequence Number
PSSN PDU Set Sequence Number
PT Payload type
QP Quantization parameter
QOS Quality of service
RAN radio access network
RTP Real-time transport protocol
RTSP Real-time streaming protocol
Rx reception or receiver
SDP Session description protocol
SEI supplemental enhancement information
SIP Session initiation protocol
SMF Session Management Function
SRTP Secure real-time transport protocol
TRP transmission-reception point
Tx transmission or transmitter
UDP User datagram protocol
UE user equipment (e.g., a wireless, typically mobile device)
UL uplink (e.g., from UE to network)
URI Uniform resource identifier
V3C Visual volumetric video-based coding
VDP Viewport-dependent processing
VDS viewport-dependent streaming
V-PCC Video-based point cloud compression
VR Virtual reality
VVC versatile video coding
WG working group
XR extended reality

What is claimed is:

1. A method, comprising:
defining, at a sender of a bitstream of coded 360-degree video, protocol data unit sets of the coded 360-degree video, the protocol data unit sets comprising at least one spatial region of a frame of the coded 360-degree video;
assigning, by the sender, protocol data unit set importance values to the protocol data unit sets, wherein the assignment is based on a spatial location of the at least one spatial region comprised in the protocol data unit sets and based on adaptation criteria;
adapting, by the sender, over time the protocol data unit set importance values of the protocol data unit sets corresponding to the spatial location based on the adaptation criteria; and
sending, by the sender toward a receiver, the bitstream comprising the coded 360-degree video.

2. An apparatus, comprising:
one or more processors; and
one or more memories storing instructions that, when executed by the one or more processors, cause the apparatus at least to perform:
defining, at a sender of a bitstream of coded 360-degree video, protocol data unit sets of the coded 360-degree video, the protocol data unit sets comprising at least one spatial region of a frame of the coded 360-degree video;
assigning, by the sender, protocol data unit set importance values to the protocol data unit sets, wherein the assignment is based on a spatial location of the at least one spatial region comprised in the protocol data unit sets and based on adaptation criteria;

adapting, by the sender, over time the protocol data unit set importance values of the protocol data unit sets corresponding to the spatial location based on the adaptation criteria; and sending, by the sender toward a receiver, the bitstream comprising the coded 360-degree video.

3. The apparatus according to claim 2, wherein the spatial region comprises one or more tiles or one or more subpictures of the frame of the coded 360-degree video.

4. The apparatus according to claim 2, wherein the spatial region comprises a group of tiles of the coded 360-degree video or a group of subpictures of the coded 360-degree video.

5. The apparatus according to claim 2, performed at a media resource function on a path that has received a viewport-independent stream with a fixed protocol data unit set importance value for a whole frame of video, wherein the at least one spatial region comprise tiles or subpictures, and wherein adapting the protocol data unit set importance values comprises setting a protocol data unit set importance value dynamically for different tiles or subpictures of the coded 360-degree video after re-encoding a viewport-independent 360-degree video into a viewport-dependent video based on a receiver's viewport or pose.

6. The apparatus according to claim 2, wherein adapting protocol data unit set importance values comprises assigning importance values to protocol data unit sets in a following order: viewport is more important than viewport margins, which is more important than background.

7. The apparatus according to claim 2, wherein adapting protocol data unit set importance values comprises using a direction of a predicted head motion to adapt the protocol data unit set importance values for the at least one spatial region in a picture.

8. The apparatus according to claim 2, wherein adapting protocol data unit set importance values comprises using a user's head rotation velocity or acceleration to adapt the protocol data unit set importance values for multiple tiles or subpictures in a picture.

9. The apparatus according to claim 2, wherein the coded 360-degree video contains overlays and the adapting protocol data unit set importance values comprises depending on overlay content in the overlays, assigning a higher or lower importance to protocol data unit sets of an overlay stream comprising the overlays compared with importance values assigned to a viewport tile.

10. The apparatus according to claim 2, wherein adapting protocol data unit set importance values comprises based on a visual saliency map being available, setting the protocol data unit set importance values for different tiles are based on that visual saliency map.

11. The apparatus according to claim 10, wherein the visual saliency map is calculated from spatial quality profile of a frame of video in the coded 360-degree video.

12. The apparatus according to claim 2, wherein adapting protocol data unit set importance values comprises basing the protocol data unit set importance values for different tiles or subpictures on distance from a gaze point, wherein the gaze point is one or both of the following:

tracked and reported by a viewing device; or estimated or predicted by a sender or a network entity, based on one or more of the following: previously reported gaze data by a viewing device, viewing patterns, historical gaze data, visual content of video corresponding to the coded 360-degree video.

13. The apparatus according to claim 2, wherein adapting protocol data unit set importance values comprises basing a number, a size, or values for protocol data unit set importance values of tiles or subpictures in a frame of video in the coded 360-degree video on one or more of the following:

scene information, from a scene description or from a rendering engine;

reported or predicted gaze for the frame;

quality of service policy;

human visual system (HVS); or display and optical characteristics of a viewing device used to view the coded 360-degree video.

14. The apparatus according to claim 2, wherein the adaptation criteria is at least one of a user's actual viewport, predicted viewport, a user's actual eye gaze, predicted eye gaze, and other content-related metadata.

15. The apparatus according to claim 2, wherein the sender comprises one of an application server, a user equipment or a media resource function.

16. The apparatus according to claim 2, wherein the sending is performed by indicating a protocol data unit set structure by a field in a protocol data unit set header extension.

17. The apparatus according to claim 16, wherein the field is a 2-bit field, where different protocol data unit set structures are denoted by different values: a first set of two bits indicates picture/frame; a second set of the two bits indicates a slice; a third set of the two bits indicates a tile; and a fourth set of the two bits indicates one of other or undefined.

18. The apparatus according to claim 16, wherein the one or more memories further store instructions that, when executed by the one or more processors, cause the apparatus at least to perform: setting quality of service parameters for protocol data unit sets differently depending on which protocol data unit set structure is used.

19. The apparatus according to claim 18, wherein a protocol data unit set error rate (PSER) is set differently by a network depending on whether protocol data unit sets are defined as tiles, slices or frames.

20. The apparatus according to claim 18, wherein a higher protocol data unit set error rate is used if tiles are used, as compared to a case where protocol data unit sets are frames and a lower protocol data unit set error rate is used.

21. The apparatus according to claim 2, wherein the sending is performed by indicating a protocol data unit set structure via control plane signaling.

22. An apparatus, comprising:

one or more processors; and one or more memories storing instructions that, when executed by the one or more processors, cause the apparatus at least to perform:

receiving, at a receiver from a sender, a bitstream of coded 360-degree video wherein protocol data unit sets of individual pictures of the coded 360-degree video are defined as spatial regions, the bitstream formed using spatial adaptation of protocol data unit set importance values for the spatial regions in a picture of video from the coded 360-degree video based on adaptation criteria, the receiving including receiving the spatial adaptation signaled in the coded 360-degree video of the bitstream, wherein the protocol data unit sets are assigned different importance values at different time points;

parsing, by the receiver, information from the coded 360-degree video based at least on the spatial adaptation of protocol data unit set importance values for multiple tiles or subpictures in the picture of video from the coded 360-degree video based on the adaptation criteria; and outputting, by the receiver, at least part of a decoded 360-degree video based on the parsed information.

* * * * *